United States Patent
Bell

(10) Patent No.: US 10,928,204 B2
(45) Date of Patent: **\*Feb. 23, 2021**

(54) INDUSTRIAL VEHICLE WITH FEATURE-BASED LOCALIZATION AND NAVIGATION

(71) Applicant: Crown Equipment Corporation, New Bremen, OH (US)

(72) Inventor: Mark Bell, Auckland (NZ)

(73) Assignee: Crown Equipment Corporation, New Bremen, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/589,526

(22) Filed: Oct. 1, 2019

(65) Prior Publication Data

US 2020/0033134 A1 Jan. 30, 2020

Related U.S. Application Data

(63) Continuation of application No. 16/179,793, filed on Nov. 2, 2018, now Pat. No. 10,473,469, which is a (Continued)

(51) Int. Cl.
*G01C 21/20* (2006.01)
*G06T 7/73* (2017.01)
(Continued)

(52) U.S. Cl.
CPC ......... *G01C 21/206* (2013.01); *G05D 1/0246* (2013.01); *G06K 9/00664* (2013.01);
(Continued)

(58) Field of Classification Search
CPC ......... G01C 21/206; G06T 7/73; G06T 5/002; G06T 5/20; G06T 2207/20016;
(Continued)

(56) References Cited

U.S. PATENT DOCUMENTS 5,586,620 A 12/1996 Dammeyer et al.
6,459,955 B1 10/2002 Bartsch et al.
(Continued)

FOREIGN PATENT DOCUMENTS

EP 0 366 350 A2 5/1990
EP 366350 A2 5/1990

OTHER PUBLICATIONS

Lindeberg, "Scale-space theory: A basic tool for analysing structures at different scales" [online] published 1994. Retrieved on Oct. 31, 2016. Retrieved from the Internet <URL: http://webcache.googleusercontent.com/search?p=cache:jgBQU771BOgJ:citeseerx.ist.psu.edu/vi ewdoc/download%3Fdoi%3D 10 .1.1.140.3975°/026rep0 /03Drep 1%26type%3Dpdf+&cd=2&hl=en& ct=clnk&gl=us> (p. 5-7, 12, 15-17, 21, 24, 29, 33, 25, 35, 40).
(Continued)

*Primary Examiner* — Carol Wang
(74) *Attorney, Agent, or Firm* — Dinsmore & Shohl LLP

(57) ABSTRACT

An industrial vehicle is provided comprising a drive mechanism, a steering mechanism, a vehicle controller, a camera, and a navigation module. The camera is communicatively coupled to the navigation module, the vehicle controller is responsive to commands from the navigation module, and the drive mechanism and the steering mechanism are responsive to commands from the vehicle controller. The camera is configured to capture an input image of a warehouse ceiling comprising elongated skylights characterized by different rates of image intensity change along longitudinal and transverse axial directions, and ceiling lights characterized by a circularly symmetric rate of image intensity change. The navigation module is configured to distinguish between the ceiling lights and the skylights and send commands to the vehicle controller for localization, or to navigate the industrial vehicle through the warehouse based (Continued)

upon valid ceiling light identification, valid skylight identification, or both.

19 Claims, 25 Drawing Sheets

Related U.S. Application Data continuation of application No. 15/968,971, filed on May 2, 2018, now Pat. No. 10,151,591, which is a continuation of application No. 15/847,113, filed on Dec. 19, 2017, now Pat. No. 10,041,801, which is a continuation of application No. 15/255,785, filed on Sep. 2, 2016, now Pat. No. 9,880,009.

(60) Provisional application No. 62/219,259, filed on Sep. 16, 2015, provisional application No. 62/214,445, filed on Sep. 4, 2015.

(51) Int. Cl.
  *G06K 9/00* (2006.01)
  *G06K 9/46* (2006.01)
  *G06K 9/52* (2006.01)
  *G05D 1/02* (2020.01)
  *G06K 9/62* (2006.01)
  *G06K 9/78* (2006.01)
  *G06T 5/00* (2006.01)
  *G06T 5/20* (2006.01)

(52) U.S. Cl.
  CPC ....... *G06K 9/00791* (2013.01); *G06K 9/4671* (2013.01); *G06K 9/527* (2013.01); *G06K 9/6232* (2013.01); *G06K 9/78* (2013.01); *G06T 5/002* (2013.01); *G06T 5/20* (2013.01); *G06T 7/73* (2017.01); *G05D 2201/0216* (2013.01); *G06T 2207/10016* (2013.01); *G06T 2207/20016* (2013.01); *G06T 2207/30241* (2013.01); *G06T 2207/30244* (2013.01); *G06T 2207/30252* (2013.01)

(58) Field of Classification Search
  CPC ........... G06T 2207/30241; G06T 2207/30252; G06K 9/78; G06K 9/6232; G06K 9/00791; G05D 1/0246; G05D 2201/0216
  See application file for complete search history.

(56) References Cited

U.S. PATENT DOCUMENTS

| | | | |
|---|---|---|---|
| 6,526,156 B1* | 2/2003 | Black | G06K 9/32 382/103 |
| 9,087,384 B2 | 7/2015 | Holeva et al. | |
| 9,349,181 B2 | 5/2016 | Chandrasekar et al. | |
| 2009/0324087 A1* | 12/2009 | Kletter | G06T 7/13 382/195 |
| 2010/0001991 A1 | 1/2010 | Jeong et al. | |
| 2010/0232643 A1 | 9/2010 | Chen et al. | |
| 2014/0195076 A1 | 7/2014 | Waltz et al. | |
| 2014/0235267 A1 | 8/2014 | Song et al. | |
| 2015/0094900 A1 | 4/2015 | Bell et al. | |
| 2015/0379704 A1 | 12/2015 | Chandrasekar et al. | |
| 2016/0011595 A1 | 1/2016 | Bell et al. | |
| 2016/0090281 A1 | 3/2016 | Bell | |
| 2016/0353099 A1 | 12/2016 | Thomson et al. | |

OTHER PUBLICATIONS

Bay et al. "Speeded-Up Robust Features (SURF)" [online] Computer Vision and Image Understanding 110. published Dec. 5, 2007. Retrieved on Oct. 31, 2016, http://homes.esat.kuleuven.be/-konijn/publications/2008/CVIUHB-08.pdf, p. 350, col. 2; p. 353, col. 1.

Krig, "Interest Point Detector and Feature Descriptor Survey" [online] published May 26, 2014. Retrieved on Oct. 31, 2016. Retrieved from the Internet<URL: http:I/link.springercom/chapter/10.1007/978-1-4302-5930-5_6/fulltext.html> p. 2, 7, 37, 39-40.

Fogg II, "Forensics Image Background Matching Using Scale Invariant Feature transform {SIFT) and Speeded Up Robust Features (SURF)" [online], published Dec. 2007. Retrieved on Oct. 31, 2016. Retrieved from the internet<URL: http://www.dtic.mil/dtic/tr/fulltexUu2/a476943.pdf, p. 31 and p. 35.

International Search Report pertaining to PCT/US2016/050135, dated Dec. 13, 2016, 4 pages.

Written Opinion pertaining to PCT/US2016/050135, dated Dec. 13, 2016, 6 pages.

Adelson et al., "Pyramid Methods in Image Processing", Nov./Dec. 1984, 33-41, RCA Corporation.

Otsu, Nobuyuki, "A Threshold Selection Method from Gray-Level Histograms", IEEE Transactions on Systems, Man, and Cybernetics, vol. SMC-9, No. 1, 62-66.

Launay, Fabien, Akihisa Ohya, and Shin'ichi Yuta. "A corridors lights based navigation system including path definition 9 Using a topologically corrected map for indoor mobile robots." In Robotics and Automation, 2002. Proceedings. CRA'02. IEEE International Conference on, vol. 4, pp. 3918-3923. IEEE, 2002.

Jeong, WooYeon, and Kyoung Mu Lee. "CV-SLAM: A new ceiling vision-based SLAM technique." In Intelligent Robots and Systems, 2005.(1ROS 2005). 2005 IEEE/RSJ International Conference on, pp. 3195-3200. IEEE, 2005.

Hwang, Seo-Yeon, and Jae-Bok Song. "Stable monocular SLAM with indistinguishable features on estimated ceiling plane using upward camera" In Control, Automation and Systems, 2008. ICCAS 2008. International Conference on, pp. 704-709. IEEE, 2008.

Australian Examination Report dated Dec. 11, 2019 for application No. 2016/316037 filed Sep. 2, 2016.

Lindeberg, "Scale-space theory: A basic tool for analysing structures at different scales" [online] published 1994. Retrieved on Oct. 31, 2016. Retrieved from the Internet <URL: http://webcache.googleusercontent.com/search?g=cache:jgBQU771BOgJ:citeseerx.ist.psu.edu/vi ewdoc/download%3Fdoi%3D10.1.1.140.3975%/026rep%/03Drep 1 %26type%3Dpdf+&cd=2&hl=en& ct=clnk&gl=us> (p. 5-7, 12, 15-17, 21, 24, 29, 33, 25, 35, 40).

Bay et al. "Speeded-Up Robust Features (SURF)" [online] Computer Vision and Image Understanding 110. published Dec. 15, 2007. Retrieved on Oct. 31, 2016, http://homes.esat.kuleuven.be/-konijn/publications/2008/CVIU-HB-08.pdf, p. 350, col. 2; p. 353, col. 1.

Krig, "Interest Point Detector and Feature Descriptor Survey" [online] published May 26, 2014. Retrieved on Oct. 31, 2016. Retrieved from the Internet<URL: http://link.springercom/chapter/10.1007/978-1-4302-5930-5_6/fulltext.html> p. 2, 7, 37, 39-40.

Fogg II, "Forensics Image Background Matching Using Scale Invariant Feature transform (SIFT) and Speeded Up Robust Features (SURF)" [online], published Dec. 2007. Retrieved on Oct. 31, 2016. Retrieved from the Internet<URL: http://www.dtic.mil/dtic/tr/fulltext/u2/a476943.pdf, p. 31 and p. 35.

Launay, Fabien, Akihisa Ohya, and Shin'ichi Yuta. "A corridors lights based navigation system including path definition using a topologically corrected map for indoor mobile robots." In Robotics and Automation, 2002. Proceedings. ICRA'02. IEEE International Conference on, vol. 4, pp. 3918-3923. IEEE, 2002.

Office Action dated Nov. 24, 2020 pertaining to Mexican Patent Application No. MX/a/2018/002739 filed Sep. 2, 2016.

* cited by examiner

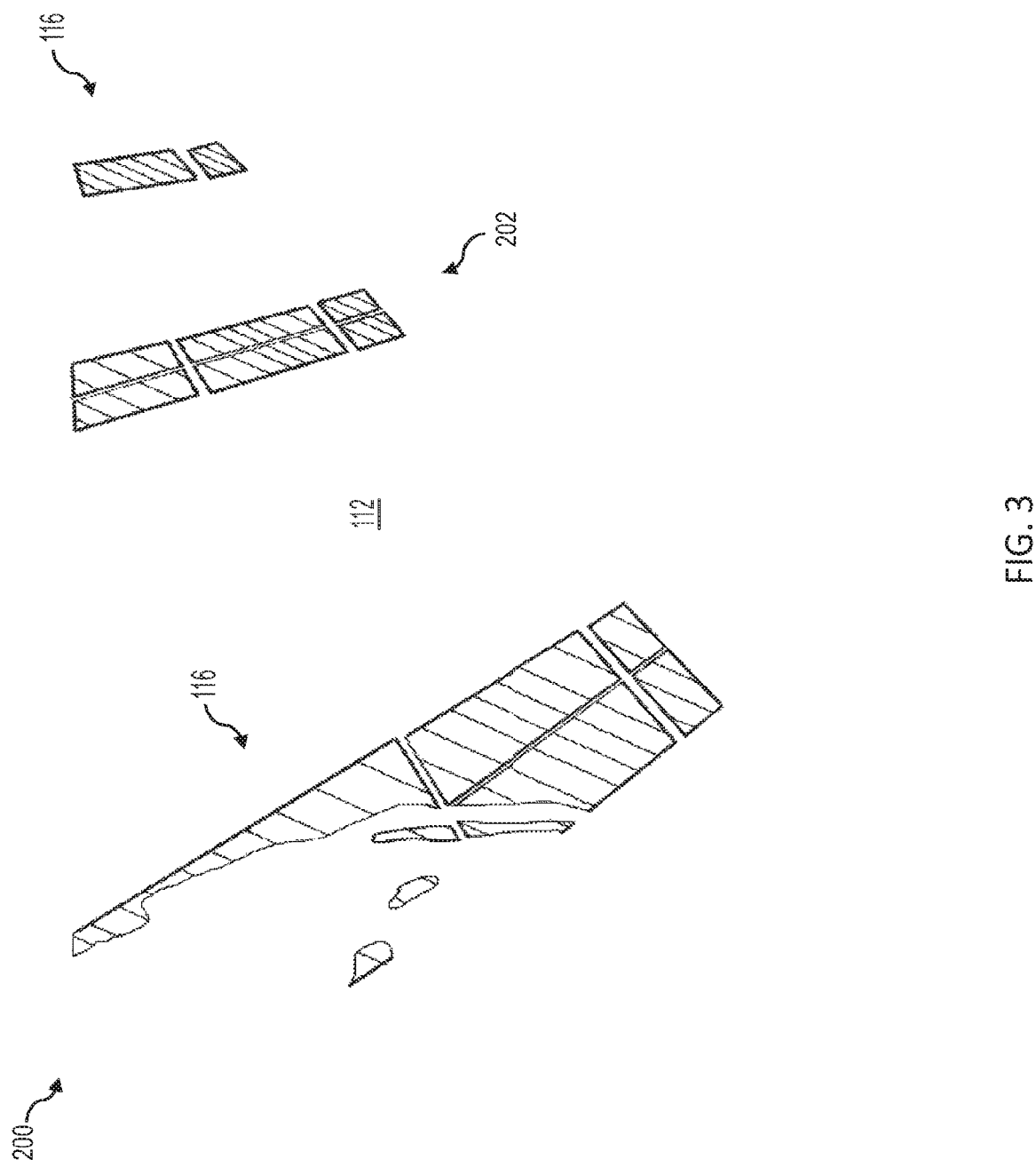

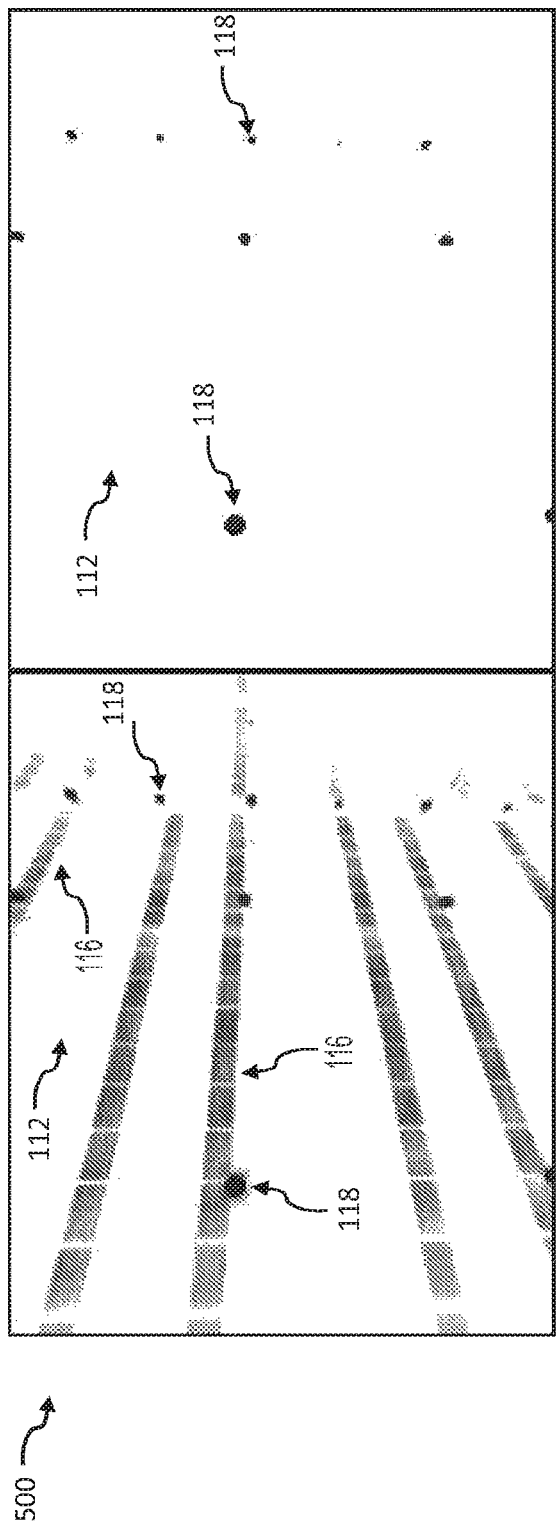

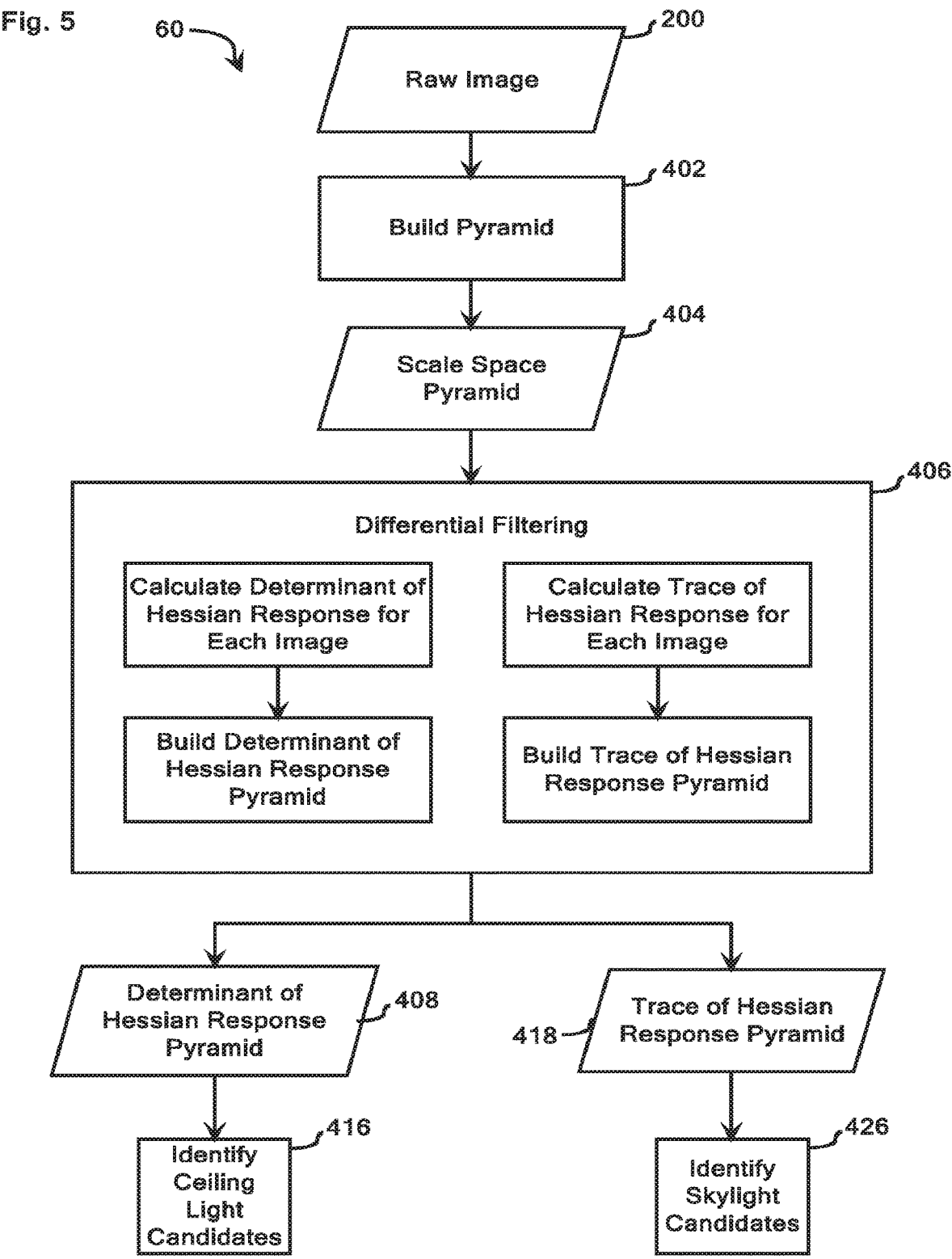

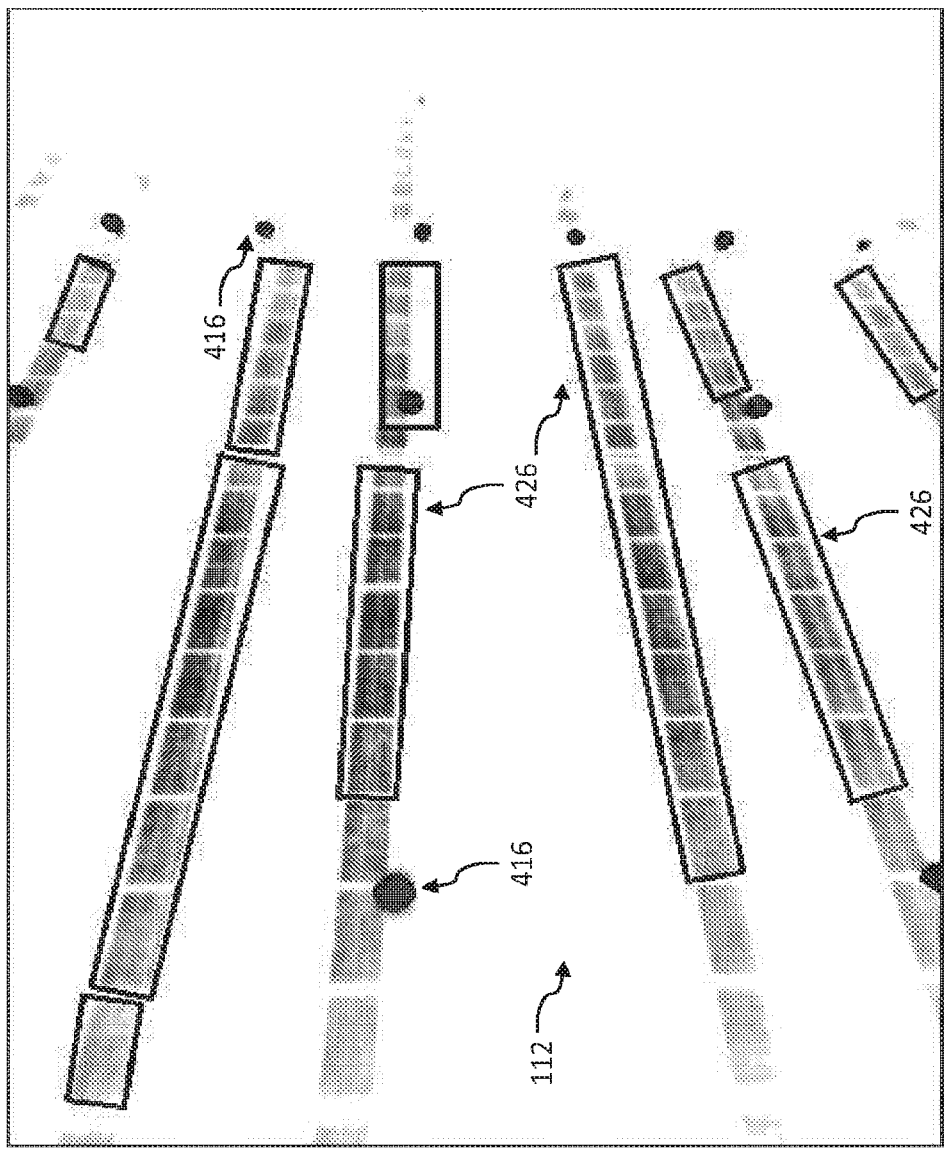

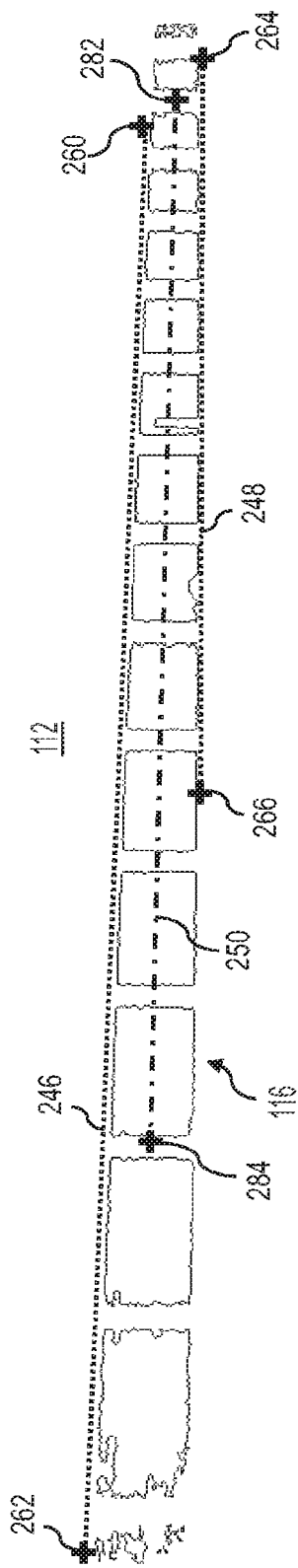
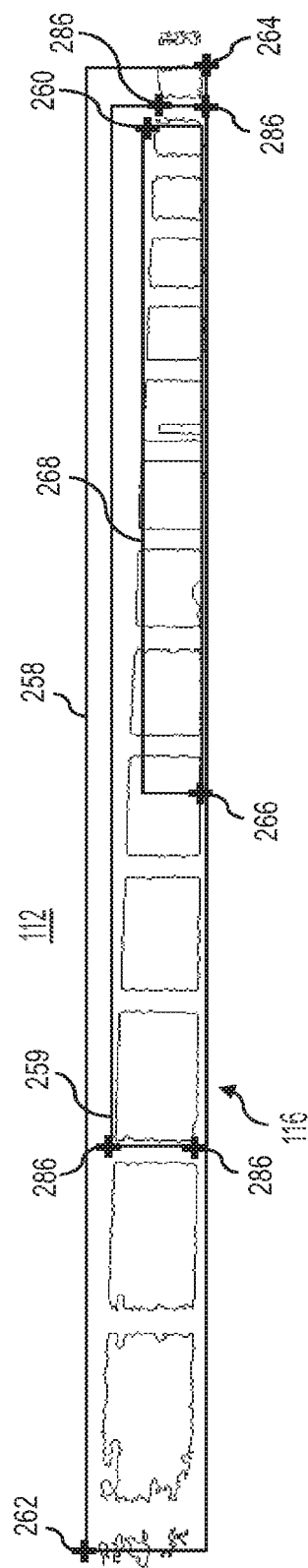
FIG. 19A
FIG. 19B

INDUSTRIAL VEHICLE WITH FEATURE-BASED LOCALIZATION AND NAVIGATION

CROSS-REFERENCE TO RELATED APPLICATIONS

This application which claims priority as a continuation of U.S. Non-Provisional application Ser. No. 16/179,793 filed Nov. 2, 2018, which is a continuation of U.S. Non-Provisional application Ser. No. 15/968,971 filed May 2, 2018, now U.S. Pat. No. 10,151,591, which is a continuation to U.S. Non-Provisional application Ser. No. 15/847,113 filed Dec. 19, 2017, now U.S. Pat. No. 10,041,801, which is a continuation to U.S. Non-Provisional application Ser. No. 15/255,785 filed Sep. 2, 2016, now U.S. Pat. No. 9,880,009, which claims priority to U.S. Provisional application Ser. Nos. 62/214,445, filed Sep. 4, 2015, and 62/219,259, filed Sep. 16, 2015.

BACKGROUND

Field

The present disclosure relates to systems and methods for providing illumination-invariant feature detection and, more specifically, to systems and methods for providing illumination-invariant functions for feature detection.

Technical Background

In order to move items about an industrial environment, workers often utilize industrial vehicles, including for example, forklift trucks, hand and motor driven pallet trucks, and/or other materials handling vehicles. The industrial vehicles can be configured as an automated guided vehicle or a manually guided vehicle that navigates through the environment. In order to facilitate automated guidance, or any type of vehicle navigation, the industrial vehicle may be adapted for localization within the environment. That is, the industrial vehicle can be adapted with sensors and processors for localization, i.e., determining the location and, optionally, the pose of the industrial vehicle within the environment. The sensors can be configured to detect objects in the environment and the localization can be dependent upon features extracted from such detected objects. Systems of this nature are described in, for example, US PG Pub. Nos. 2016/0090281 and 2016/0011595.

BRIEF SUMMARY

In accordance with one embodiment of the present disclosure, an industrial vehicle is provided comprising a drive mechanism, a steering mechanism, a vehicle controller, a camera, and a navigation module. The camera is communicatively coupled to the navigation module, the vehicle controller is responsive to commands from the navigation module, and the drive mechanism and the steering mechanism are responsive to commands from the vehicle controller. The camera is configured to capture an input image of a warehouse ceiling comprising elongated skylights characterized by different rates of image intensity change along longitudinal and transverse axial directions, and ceiling lights characterized by a circularly symmetric rate of image intensity change. The navigation module is configured to distinguish between the ceiling lights and the skylights and sends commands to the vehicle controller to navigate the industrial vehicle through the warehouse based upon valid ceiling light identification, valid skylight identification, or both.

More specifically, it is contemplated that the navigation module may execute machine readable instructions to create a Gaussian scale space pyramid from the input image of the warehouse ceiling, wherein the Gaussian scale space pyramid comprises a plurality of scale space images. The module calculates a determinant of Hessian response for each image within the Gaussian scale space pyramid and builds a determinant of Hessian response pyramid of the same size and structure as the Gaussian scale space pyramid. The module also calculates a trace of Hessian response for each image within the Gaussian scale space pyramid and builds a trace of Hessian response pyramid of the same size and structure as the Gaussian scale space pyramid. The module utilizes the determinant of Hessian response pyramid to identify ceiling light candidates in the input image of the warehouse ceiling, and the trace of Hessian response pyramid to identify skylight candidates in the input image of the warehouse ceiling. The ceiling light candidates are subjected to ceiling light candidate feature processing to identify valid ceiling lights in the warehouse, and the skylight candidates are subjected to skylight candidate feature processing to identify valid skylights in the warehouse.

It is contemplated that the Gaussian scale space pyramid can be created by running a cascading series of image smoothing operations applied to the input image of the warehouse ceiling and can be approximated by convolution with binomial filter kernels. It is also contemplated that the Gaussian scale space pyramid can be created by supplementing the cascading series of image smoothing operations with subsampling operations. The supplemental subsampling operations can be implemented conditionally as a function of available navigation module computing power.

The determinant of Hessian response and trace of Hessian response can be calculated based on each scale space image being convolved with second-order partial derivative filter kernels. It is also contemplated that the determinant of Hessian response can be calculated by subtraction of a mixed second-order partial derivative term. The determinant of Hessian response suppresses responses to objects characterized by different rates of image intensity change along longitudinal and transverse axial directions.

The determinant response can be utilized for multiscale non-maximum suppression wherein local maxima are located within a window comprising scale and spatial dimensions. In which case, an absolute minimum threshold can be applied to prevent excessive noisy false positive determinant responses. The determinant response can be utilized in a filtering keypoints function for removing candidate points that do not likely correspond to ceiling lights. The filtering keypoints function may utilize other filters on candidate points to check against empirically set thresholds. The other filters may comprise scales at which keypoints are detected, the spatial location of a keypoint, a magnitude of the determinant of Hessian response at the keypoint location, a machine-learning classifier, or an average trace of Hessian response values of the surrounding area. Finally, it is contemplated that the determinant response may be utilized in a refining keypoints function for refining spatial position and scale of ceiling light candidate keypoints.

The trace response can be utilized in a sum large-scale trace of Hessian response images function for summing a selection of trace of Hessian response images from a trace of Hessian response pyramid into an integrated trace of Hessian response image. It is contemplated that skylight regions can be searched for within the trace of Hessian response pyramid. The trace response may be further processed by a threshold integrated trace of Hessian response function, wherein the trace of Hessian response is smoothed and a threshold is applied. The threshold may be fixed, or not. It is also contemplated that the trace of Hessian response can be utilized in a connected component filtering function for extracting and filtering connected components based on the binary thresholded integrated trace of Hessian response image. The connected component filtering function may filter for size and aspect ratio to select substantially rectangular regions.

In accordance with another embodiment of the present disclosure, the navigation module is configured to distinguish between the ceiling lights and the skylights and send commands to the vehicle controller to localize the industrial vehicle through the warehouse based upon valid ceiling light identification, valid skylight identification, or both.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which:

FIG. 3 schematically depicts an input image showing three skylights according to one or more embodiments shown and described herein;

FIGS. 4A and 4B schematically depict input images and thresholded images showing multiple rows of skylights and multiple round lights according to one or more embodiments shown and described herein;

FIG. 5 depicts a flowchart of an exemplary algorithm for illumination-invariant feature detection of round lights and skylights according to one or more embodiments shown and described herein;

FIGS. 8A and 8B schematically depict detected feature candidates overlaid on the input image of FIGS. 4A and 4B according to one or more embodiments shown and described herein.

FIGS. 19A and 19B schematically depict edge lines and regions of interest overlaid upon the input image of FIG. 17 according to one or more embodiments shown and described herein;

DETAILED DESCRIPTION

The embodiments described herein generally relate to Environmental Based Localization techniques (EBL) for extracting features from overhead lighting including, but not limited to, skylights. The EBL may be used to localize and/or navigate an industrial vehicle through a building structure, such as a warehouse. Suitably, the overhead lighting may be mounted in or on a ceiling of a building. However, in some embodiments the lighting may also or alternatively be suspended from a ceiling or wall via suitable structure. In some embodiments, a camera can be mounted to an industrial vehicle (e.g., automated guided vehicle or a manually guided vehicle) that navigates through a warehouse. The input image can be any image captured from the camera prior to extracting features from the image.

Figure 1:
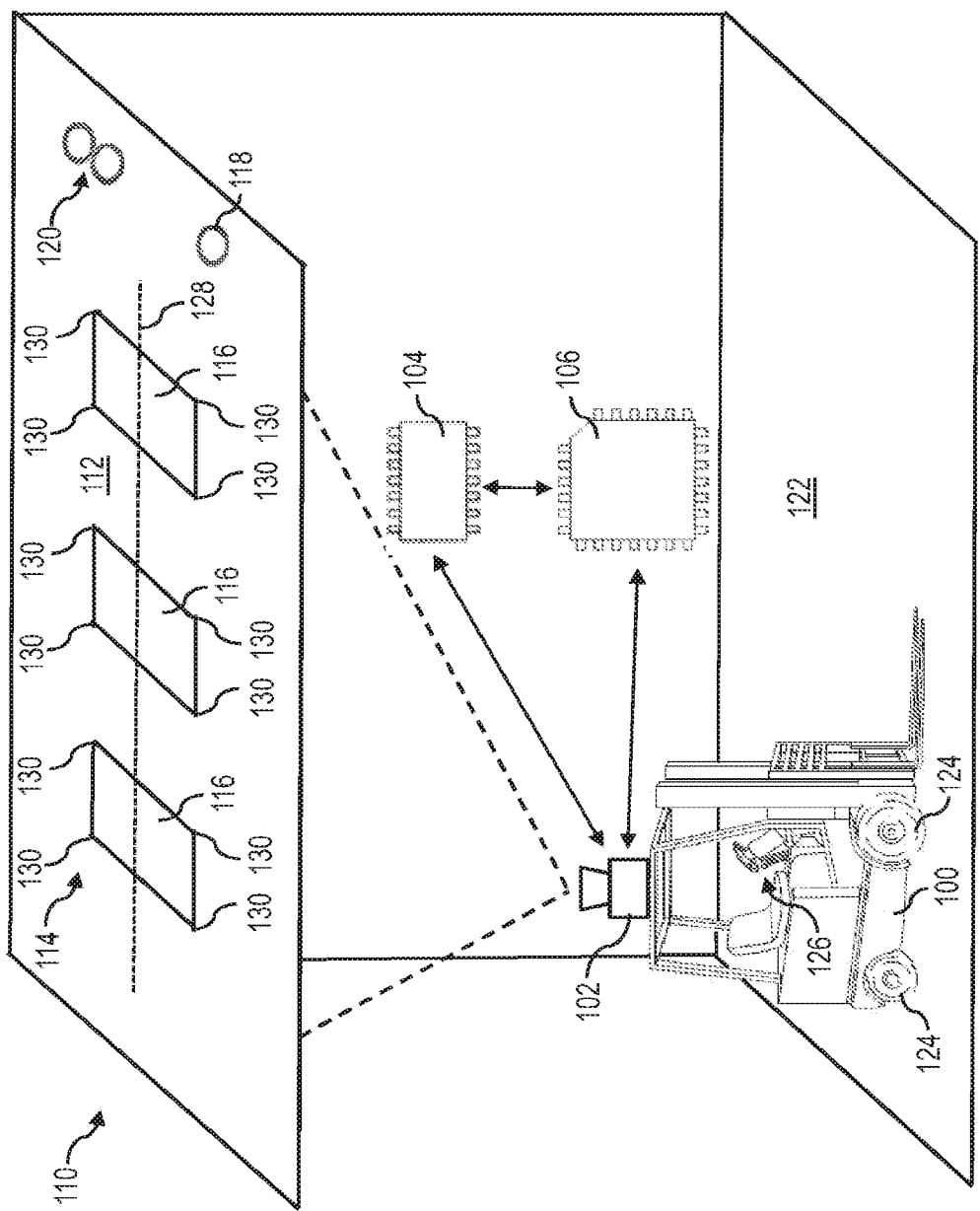
FIG. 1 depicts a vehicle for environmental based localization according to one or more embodiments shown and described herein.

Referring initially to FIG. 1, a vehicle 100 can be configured to navigate through a warehouse 110. The vehicle 100 can comprise an industrial vehicle for lifting and moving a payload such as, for example, a forklift truck, a reach truck, a turret truck, a walkie stacker truck, a tow tractor, a pallet truck, a high/low, a stacker-truck, trailer loader, a sideloader, a fork hoist, or the like. The industrial vehicle can be configured to automatically or manually navigate a surface 122 of the warehouse 110 along a desired path. Accordingly, the vehicle 100 can be directed forwards and backwards by rotation of one or more wheels 124. Additionally, the vehicle 100 can be caused to change direction by steering the one or more wheels 124. Optionally, the vehicle can comprise operator controls 126 for controlling functions of the vehicle such as, but not limited to, the speed of the wheels 124, the orientation of the wheels 124, or the like. The operator controls 126 can comprise controls that are assigned to functions of the vehicle 100 such as, for example, switches, buttons, levers, handles, pedals, input/output device, or the like. It is noted that the term "navigate" as used herein can mean controlling the movement of a vehicle from one place to another.

The vehicle 100 can further comprise a camera 102 for capturing overhead images. The camera 102 can be any device capable of capturing the visual appearance of an object and transforming the visual appearance into an image. Accordingly, the camera 102 can comprise an image sensor such as, for example, a charge coupled device, complementary metal-oxide-semiconductor sensor, or functional equivalents thereof. In some embodiments, the vehicle 100 can be located within the warehouse 110 and be configured to capture overhead images of the ceiling 112 of the warehouse 110. In order to capture overhead images, the camera 102 can be mounted to the vehicle 100 and focused to the ceiling 112. For the purpose of defining and describing the present disclosure, the term "image" as used herein can mean a representation of the appearance of a detected object. The image can be provided in a variety of machine readable representations such as, for example, JPEG, JPEG 2000, Exif, TIFF, raw image formats, GIF, BMP, PNG, Netpbm format, WEBP, raster formats, vector formats, or any other format suitable for capturing overhead objects.

The ceiling 112 of the warehouse 110 can comprise overhead lights such as, but not limited to, ceiling lights 114 for providing illumination from the ceiling 112 or generally from above a vehicle operating in the warehouse. The ceiling lights 114 can comprise substantially rectangular lights such as, for example, skylights 116, fluorescent lights, or the like; and may be mounted in or suspended from the ceiling or wall structures so as to provide illumination from above. As used herein, the term "skylight" can mean an aperture in a ceiling or roof fitted with a substantially light transmissive medium for admitting daylight, such as, for example, air, glass, plastic or the like. While skylights can come in a variety of shapes and sizes, the skylights described herein can include "standard" long, substantially rectangular skylights that may or may not be split by girders or crossbars into a series of panels. Alternatively, skylights can comprise smaller, discrete skylights of rectangular or circular shape that are similar in size to a bedroom window, i.e., about 30 inches by about 60 inches (about 73 cm by about 146 cm). Alternatively or additionally, the ceiling lights 114 can comprise substantially circular lights such as, for example, round lights 118, merged lights 120, which can comprise a plurality of adjacent round lights that appear to be a single object, or the like. Thus, overhead lights or "ceiling lights" include sources of natural (e.g. sunlight) and artificial (e.g. electrically powered) light. In some embodiments, the ceiling lights are circularly symmetric round lights and the skylights are substantially elongated. In geometry, circular symmetry is a type of continuous symmetry for a planar object that can be rotated by any arbitrary angle and map onto itself.

The embodiments described herein can comprise one or more processors 104 communicatively coupled to the camera 102. The one or more processors 104 can execute machine readable instructions to implement any of the methods or functions described herein automatically. Memory 106 for storing machine readable instructions can be communicatively coupled to the one or more processors 104, the camera 102, or any combination thereof. The one or more processors 104 can comprise a processor, an integrated circuit, a microchip, a computer, or any other computing device capable of executing machine readable instructions or that has been configured to execute functions in a manner analogous to machine readable instructions. The memory 106 can comprise RAM, ROM, a flash memory, a hard drive, or any non-transitory device capable of storing machine readable instructions.

The one or more processors 104 and the memory 106 may be integral with the camera 102. Alternatively or additionally, each of the one or more processors 104 and the memory 106 can be integral with the vehicle 100. Moreover, each of the one or more processors 104 and the memory 106 can be separated from the vehicle 100 and the camera 102. For example, a server or a mobile computing device can comprise the one or more processors 104, the memory 106, or both. It is noted that the one or more processors 104, the memory 106, and the camera 102 may be discrete components communicatively coupled with one another without departing from the scope of the present disclosure. Accordingly, in some embodiments, components of the one or more processors 104, components of the memory 106, and components of the camera 102 can be physically separated from one another. The phrase "communicatively coupled," as used herein, means that components are capable of exchanging data signals with one another such as, for example, electrical signals via conductive medium, electromagnetic signals via air, optical signals via optical waveguides, or the like.

Thus, embodiments of the present disclosure may comprise logic or an algorithm written in any programming language of any generation (e.g., 1GL, 2GL, 3GL, 4GL, or 5GL). The logic or an algorithm can be written as machine language that may be directly executed by the processor, or assembly language, object-oriented programming (OOP), scripting languages, microcode, etc., that may be compiled or assembled into machine readable instructions and stored on a machine readable medium. Alternatively or additionally, the logic or algorithm may be written in a hardware description language (HDL). Further, the logic or algorithm can be implemented via either a field-programmable gate array (FPGA) configuration or an application-specific integrated circuit (ASIC), or their equivalents.

As is noted above, the vehicle 100 can comprise or be communicatively coupled with the one or more processors 104. Accordingly, the one or more processors 104 can execute machine readable instructions to operate or replace the function of the operator controls 126. The machine readable instructions can be stored upon the memory 106. Accordingly, in some embodiments, the vehicle 100 can be navigated automatically by the one or more processors 104 executing the machine readable instructions. In some embodiments, the location of the vehicle can be monitored by the EBL as the vehicle 100 is navigated.

For example, the vehicle 100 can automatically navigate along the surface 122 of the warehouse 110 along a desired path to a desired position based upon a localized position of the vehicle 100. In some embodiments, the vehicle 100 can determine the localized position of the vehicle 100 with respect to the warehouse 110. The determination of the localized position of the vehicle 100 can be performed by comparing image data to map data. The map data can be stored locally in the memory 106, which can be updated periodically, or map data provided by a server or the like. Given the localized position and the desired position, a travel path can be determined for the vehicle 100. Once the travel path is known, the vehicle 100 can travel along the travel path to navigate the surface 122 of the warehouse 110. Specifically, the one or more processors 104 can execute machine readable instructions to perform EBL functions and operate the vehicle 100. In one embodiment, the one or more processors 104 can adjust the steering of the wheels 124 and control the throttle to cause the vehicle 100 to navigate the surface 122.

Figure 2:
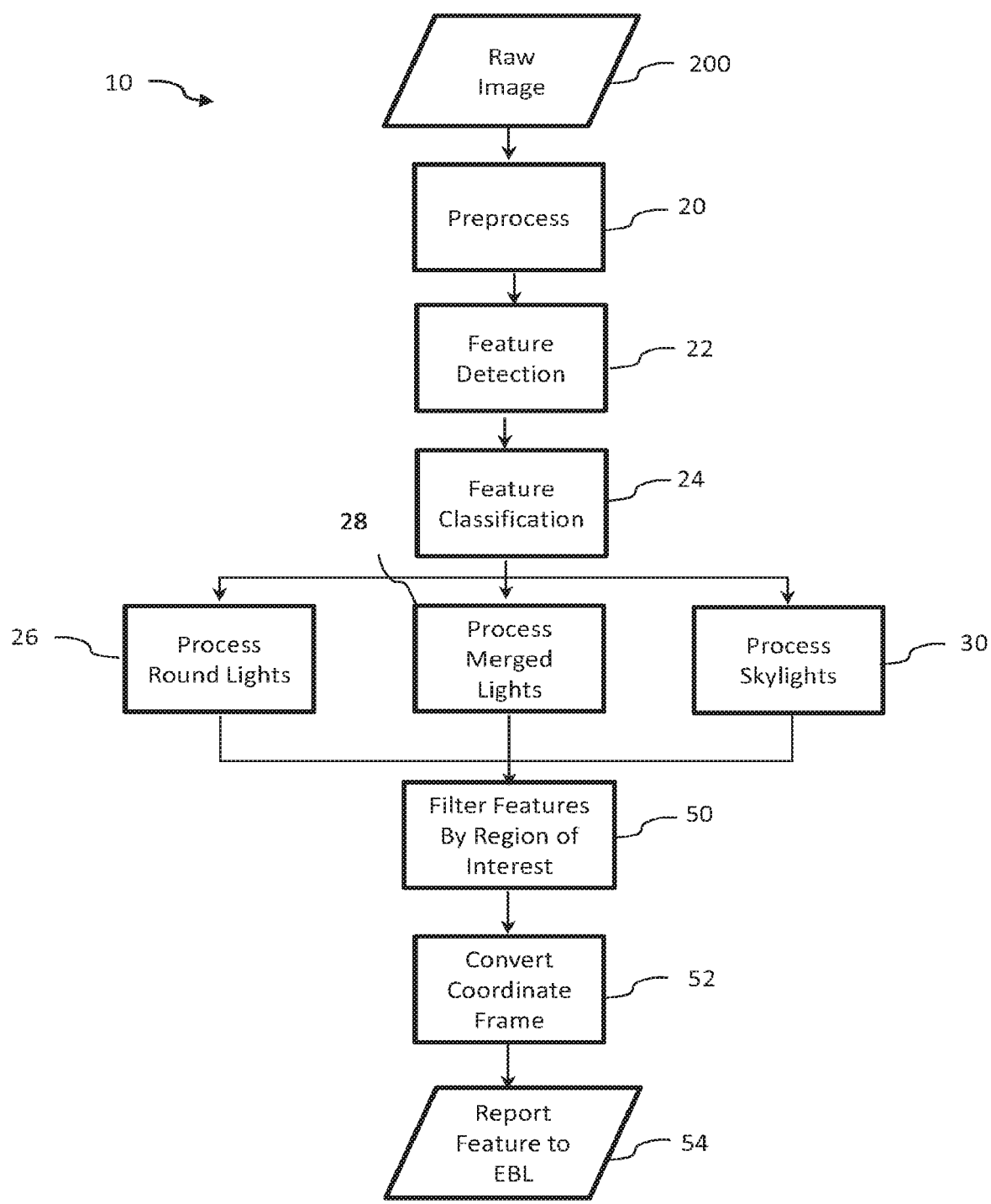
FIG. 2 depicts a flowchart of an exemplary algorithm for camera feature extraction/overhead lighting feature extraction for environmental based localization according to one or more embodiments shown and described herein.

Referring now to FIG. 2, a flow chart of a sequence of functions for a full Camera Feature Extraction (CFE) algorithm 10 is schematically depicted. It is noted that, while the functions are enumerated and depicted as being performed in a particular sequence in the depicted embodiment, the functions can be performed in an alternative order without departing from the scope of the present disclosure. It is furthermore noted that one or more of the functions can be omitted without departing from the scope of the embodiments described herein.

Referring collectively to FIGS. 1-3, the CFE algorithm 10 can comprise a preprocess function 20 for processing the input image 200 of the ceiling 112 prior to executing further functions on the input image 200. The input image 200 is depicted as having captured a frame that includes skylights 116 corresponding to the skylights 116 of a warehouse 110. In some embodiments, the preprocess function 20 can comprise functions for the removal of lens distortion effects from the input image 200. Alternatively or additionally, the input image 200 can be captured by deliberately underexposing the input image 200 in order to highlight the ceiling lights 114, which can include skylights 116. It has been discovered that low exposure can aid in reducing reflections and other spurious artifacts, which can make the feature extraction processing more complicated and less reliable.

The CFE algorithm 10 can further comprise a feature detection function 22 for detecting low-level features from the input image 200 of the ceiling 112. The feature detection function 22 can utilize one or more feature detection algorithms such as, for example, maximally stable extremal regions (MSER) algorithm, a thresholding step combined with Otsu's method to extract raw features (i.e. lights) from the image, an illumination-invariant low-level feature detector utilizing differential images, or equivalent algorithms. The raw low-level features may consist of points, connected pixel regions defined by bounding boxes, or the like, and indicate candidate locations for further processing to determine features sufficient for localization. Specifically, the detected features from the input images 200 can be utilized by the localization process to determine the positions of ceiling lights 114 that are captured by the camera 102. For example, centroids can be extracted from round lighting features such as substantially circular shaped lights. Additionally, for smaller skylights the full extent of the smaller skylight can be captured within a single image frame. Accordingly, a centroid extraction function can be applied, as per substantially circular lights. Additionally or alternatively, corners 130 or point fixes can be extracted from longer or larger substantially rectangular lights, such as long skylights consisting of a series of panels separated by roofing structure.

Referring collectively to FIGS. 1-3, during the feature detection function 22 to determine candidate feature regions to input into the process round lights function 26, process merged lights function 28 and process skylights function 30, algorithms such as thresholding with Otsu's method can fail for EBL purposes when the appearance of warehouse ceiling lights 114 in the input image 200 are not of similar brightness.

Certain feature detection processes 22 such as Otsu's method can find the optimum global image threshold in terms of maximizing the inter-class (foreground and background pixel classes) variance. Otsu's method is fully described in the work, "*A threshold selection method from gray-level histograms.*" Automatica, 11(285-296), 23-27 (1975). This allows the global image threshold to be chosen with some degree of flexibility and robustness, as opposed to manually fixing a threshold by hand at each site.

Using Otsu's method to determine thresholds across the EBL sites ensures the threshold will vary according to the brightness of the ceiling lights 114 at each site. This approach is most appropriate for locations with artificial lights, all of similar brightness. In locations where large variations in illumination intensity are present, such as is common with skylights 116, another approach may be more accurate. Specifically, using the Otsu or similar method to extract feature may be less than optimal if there are multiple types of lighting with different brightness levels, or the resultant global image threshold is unsuitable for the dimmer portions of the input image 200 and desirable features for EBL are missed.

Referring again to FIGS. 2 and 5, the CFE algorithm 10 is shown. The feature detection function 22 may incorporate a process that includes illumination-invariant feature detection 60. This step is used to detect candidate features to be passed on to the feature classification function 24 and the process round lights function 26 and the process merged lights function 28 and the process skylights function 30. An illumination-invariant low-level feature detector 60 utilizing differential images is able to overcome shortcomings of image intensity thresholding, such as those explained above for Otsu's method, by detecting feature candidates at different scales as local maxima in differential image space.

Figure 4B:
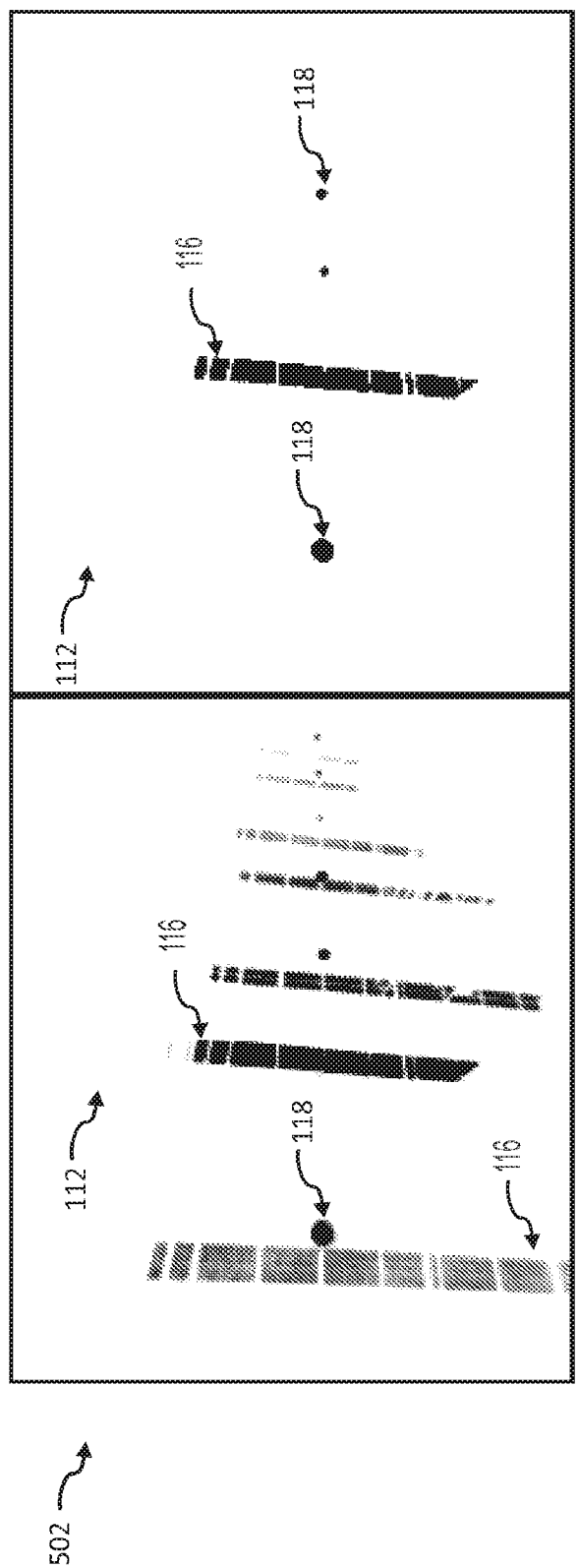

Referring collectively to FIGS. 4A and 4B, input images 500 and 502 of a ceiling 112 can be seen as processed by Otsu's method for EBL purposes. In FIG. 4A the left side of the image shows the raw input image 500, and the right side depicts the features extracted by Otsu's method where the skylights 116 have been completely ignored by the processor. In FIG. 4B the right hand section shows the presence of several skylights 116 in the raw input image 502, however, after processing only the brightest skylight 116 is detected as shown in the right side of FIG. 4B. Skylights 116 are the most difficult form of warehouse lighting 114 because the illumination levels vary significantly with time of day and weather conditions. Additionally, sunlight radiance can be unevenly spread across the scene, leaving even a single skylight 116 with both bright and dim sections.

Referring collectively to FIGS. 2 and 5, the feature detection function 22 can comprise an illumination-invariant feature detection function 60 for low-level feature detection. For example, candidate features can be extracted from the skylights 116 or round lights 118. The illumination-invariant feature detection function 60 can enable the EBL to perform robustly for skylight-heavy sites in which illumination levels are highly variable. Accordingly, instead of relying on a bi-modal system, such as Otsu's method, the illumination-invariant feature detection function 60 can detect light candidate features 416 and skylight candidate features 426 at different scales as local maxima in differential image space.

Referring now to FIG. 5, a flow chart of a sequence of functions for the illumination-invariant feature detection function 60 is schematically depicted. It is noted that, while the functions are enumerated and performed in a particular sequence in the depicted embodiment, the functions can be performed in an alternative order without departing from the scope of the present disclosure. It is furthermore noted that one or more of the functions can be omitted without departing from the scope of the embodiments described herein. Alternatively or additionally, the illumination-invariant feature detection function 60 can be performed independent of the CFE algorithm 10. For example, input for the illumination-invariant feature detection function 60, which is described in greater detail herein, can be provided via equivalent processes that are performed at a different time, via a different processor as the CFE algorithm 10, or both.

Referring collectively to FIGS. 4A, 4B, 5, 6, 9, and 10, the illumination-invariant feature detection function 60 can comprise a build pyramid function 402 for processing the input image 200 of the ceiling 112 prior to executing further functions on the input image 200 by the illumination-invariant feature detection algorithm 60. The build pyramid function 402 runs a cascading series of image smoothing and subsampling operations to create a Gaussian scale space pyramid 404 of the form shown in FIG. 6, which in some embodiments may be an approximate Gaussian space pyramid. Images with large scale are those that have been smoothed more; a Gaussian blur is a low pass filter so images with more smoothing only retain coarse, large features. The scale space construction might not involve subsampling, but it may be necessary for a real-time implementation on low power hardware. Put another way, the supplemental subsampling operations may be implemented conditionally as a function of available navigation module computing power. The Gaussian smoothing operations may also be approximated by convolution with binomial filter kernels for performance reasons. The build pyramid outputs the approximate Gaussian scale space pyramid 404, to be filtered and processed by the illumination-invariant feature detection algorithm 60.

The illumination-invariant feature detection function 60 can comprise differential filtering 406 for calculating determinant of Hessian and trace of Hessian response pyramids 408, 418 of the size and structure of the scale space pyramid 404, for ceiling lights 114 and skylights 116, respectively. Specifically, the differential filtering 406 forms the response pyramids 408, 418 to distinguish between ceiling lights 114 and skylights 116. Differential filtering 406 takes as input an approximate Gaussian scale space pyramid 404 from an input image 200 of a warehouse ceiling 112 comprising ceiling objects (ceiling lights 114, skylights 116). The differential filtering 406 is applied to calculate a determinant of Hessian response for each image within the approximate Gaussian scale space pyramid 404 to build a determinant of Hessian response pyramid 408. The differential filtering 406 is applied to calculate a trace of Hessian response for each image within the approximate Gaussian scale space pyramid 404 to build a trace of Hessian response pyramid 418. The response pyramids 408, 418 are calculated such that they are of the same size and structure as the approximate Gaussian scale space pyramid 404. The response pyramids 408, 418 are used to identify ceiling object candidates, i.e., by using the determinant of Hessian response pyramid 408 to find ceiling light candidates 416 and the trace of Hessian response pyramid 418 to find skylight candidates 426. For example, ceiling light candidates are subjected to ceiling light candidate feature processing to identify valid ceiling lights 114 in the warehouse 110. In another example, skylight candidates are subjected to skylight candidate feature processing to identify valid skylights 116 in the warehouse 110. The determinant of Hessian response suppresses elongated structures in an image 200, like skylights 116, and therefore is more suitable for identifying circularly symmetric features, like round ceiling lights 114. The trace of Hessian response does not suppress elongated structures in an image and can be used to identify skylights 116 or other similar elongated features in an image 200.

It is noted that each scale space image in the scale space pyramid 404, produced by the build pyramid function 402, is convolved with the second-order partial derivative filter kernels, as shown in the equations:

According to the second order partial derivative kernels of the equations, L is a scale space image from the scale space pyramid 404 and * denotes convolution of the filter kernel with L to produce the differential image. The computation of these three differential images means that the Hessian matrix is known, as shown below:

From this, the scale normalized determinant 408 and trace 418 responses of the Hessian matrix can be calculated for each scale space image in the scale space pyramid 404, as per the equations:

Here, multiplication by the variance, $\sigma^2$, and standard deviation, $\Gamma$, of the Gaussian smoothing of the present scale space image is required to scale-normalize the resultant responses and account for the decreasing magnitude of values in a highly smoothed image. This allows for differential responses from neighboring scale images to be compared directly. The subtraction of the mixed second-order partial derivative $L_{XY}$ term in the determinant 408 has the effect of suppressing responses to objects characterized by different rates of image intensity change along longitudinal and transverse axial directions, i.e., long objects like skylights 116. Circularly symmetric lights 118 have the same rate of change in both axes and give strong responses. It is for this reason the determinant 408 of Hessian response is then used to find round light candidate features 416, as shown in FIG. 5. Alternatively or additionally, the trace 418 of Hessian responds to both circularly symmetric blobs and longer ridge-like blobs, so it can be used to find skylight candidate regions.

Figure 7:
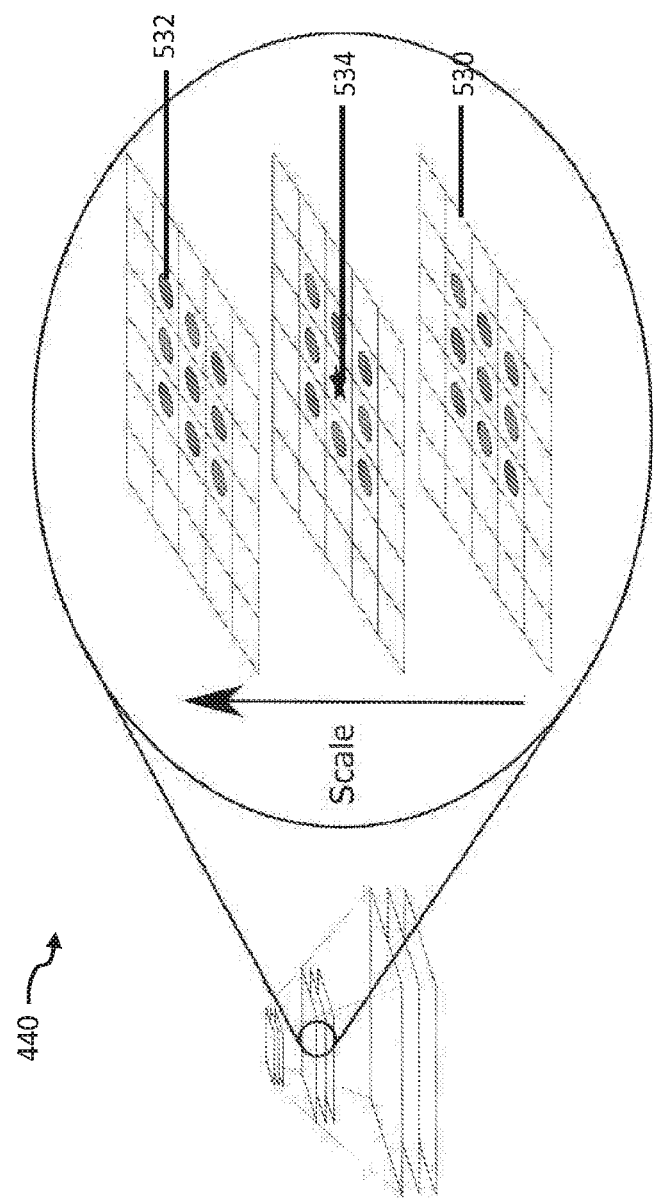
FIG. 7 schematically depicts multiscale non-maximum suppression according to one or more embodiments shown and described herein.
Figure 9:
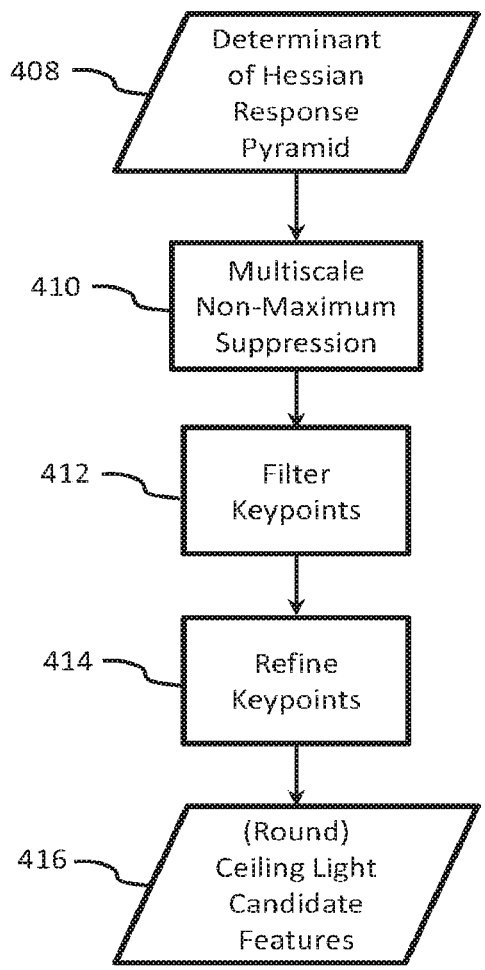
FIG. 9 depicts a flowchart of an exemplary algorithm for ceiling light candidate feature detection according to one or more embodiments shown and described herein.

Referring collectively to FIGS. 5, 7 and 9, the illumination-invariant feature detection function 60 can comprise the multiscale non-maximum suppression function 410 for round light 118 detection. Here, the detection is similar to standard computer vision interest point detectors. Specifically, local maxima are located within a 3×3×3 window 440 in the scale and spatial dimensions. Accordingly, for each pixel 532 in the determinant image, all points that are not maximal when compared to their 26 neighbors in 3×3 pixel regions in the current and adjacent scale images are suppressed. FIG. 7 illustrates this 3×3×3 window. It is noted that, for clarity, the subsampling operations used in the pyramid implementation of scale space means that exact scale neighbors cannot be found if the coarser scale image neighbor is of smaller size/resolution. Additionally, an absolute minimum threshold is applied to prevent excessive noisy false positive responses. As shown in FIG. 7, the local maximum pixel 534 in the window 530 is retained as a local maximum in the determinant of Hessian response if it is maximal with respect to its neighbor pixels 532 in scale and space Referring to FIG. 9, the illumination-invariant feature detection function 60 can comprise the filter keypoints function 412 for removing candidate points that do not likely correspond to ceiling lights, such as ceiling lights that do not meet a threshold. Despite the multiscale non-maximum suppression function 410, many candidate points can be returned, hundreds if the threshold is set too low and is picking out dim lights. It is necessary to filter this set down to those that are likely to actually correspond to ceiling lights. Specifically, it is noted that, all determinant of Hessian maxima with a negative trace of Hessian value are retained as they correspond to bright blobs on a dark background, representing lights, and those with a positive value, corresponding to dark blobs, are removed. The filter keypoints function 412 may then use several other filters on the candidate points to check against empirically set thresholds. These may include the scales at which the keypoints were detected, the spatial location of the keypoint, the magnitude of the determinant value at the keypoint location, and, some average trace of Hessian values of the surrounding area. Alternatively or additionally, a trained classifier using statistical and machine-learning techniques may be utilized. Such a classifier may use the properties described above as feature descriptors or, alternatively or additionally, it may utilize other established feature descriptors such as Haar-like features, histogram of gradients or the like.

Referring to FIG. 9, the illumination-invariant feature detection function 60 can comprise the refine keypoints function 414 for refining the spatial position and scale of keypoints believed to be ceiling lights. Specifically, this can be done using quadratic interpolation across each of the x, y and scale dimensions, the specifics of which may be gleaned from the computer vision feature detection art. The refine keypoints function 414 outputs the ceiling light candidate features 416 for further processing by the CFE algorithm 10.

Figure 10:
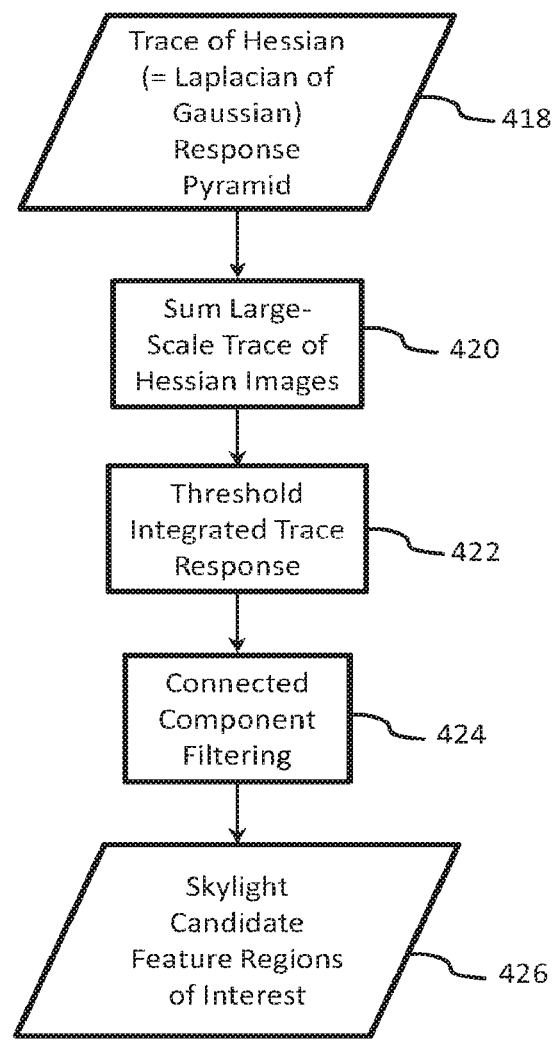
FIG. 10 depicts a flowchart of an exemplary algorithm for skylight candidate feature regions of interest detection according to one or more embodiments shown and described herein.

Referring to FIG. 10, the illumination-invariant feature detection function 60 can comprise the sum large-scale trace of Hessian images function 420 for summing a selection of trace response images from the trace response pyramid 418 into an integrated trace response image, within which skylight 116 regions are searched for. It is contemplated that the skylight detection may consist of a cross-scale search such as the point/light candidate detection process used to output the ceiling light candidate features 416. Determining the scale space line or ridge is more complex than a determining single point. The merging of multiple coarse-scale trace images (coarse scale because the skylights 116 are generally much larger features than the round ceiling lights 118) helps to account for some variation in skylight size and ultimately simplifies the remaining processing down to a single-image-processing problem instead of a whole pyramid 418.

Figure 8B:
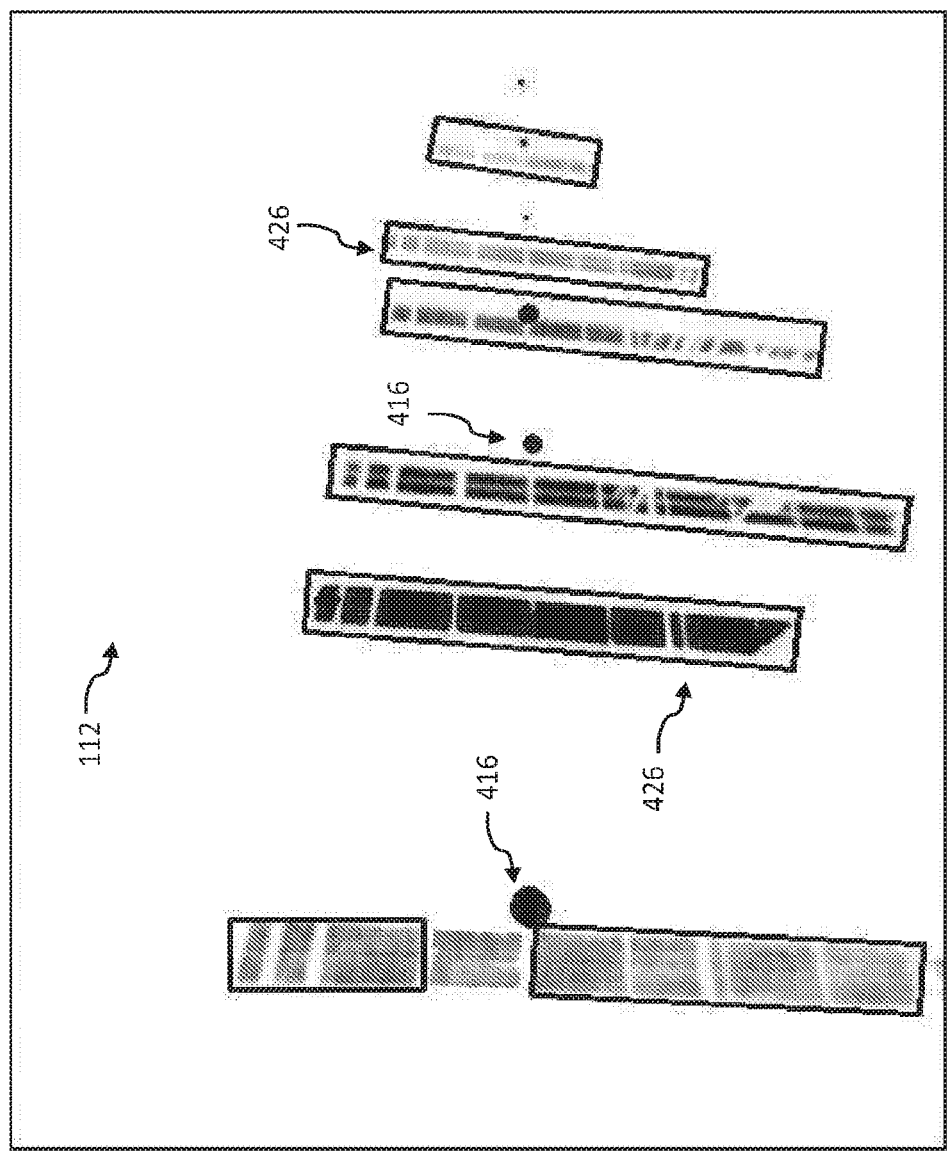

Referring to FIG. 10, the illumination-invariant feature detection function 60 can comprise the threshold integrated trace response function 422 for further processing the trace response 418. Specifically, the trace response 418 is smoothed and a threshold is applied. It is contemplated that the threshold may or may not be fixed. Referring collectively to FIGS. 8A, 8B, and 10, the illumination-invariant feature detection function 60 can comprise the connected component filtering function 424 for extracting and filtering connected components. The connected components can be extracted from the binary thresholded integrated trace of Hessian image and may be filtered for size and aspect ratio, or other suitable properties, to select substantially rectangular regions. In some embodiments, the trace of Hessian response is utilized in a connected component filtering 424 function for extracting and filtering connected components that are extracted from the binary thresholded integrated trace of Hessian response image.

The substantially rectangular regions that pass the filtering criteria can be represented by oriented bounding box regions of interest 426 and will be passed on to the existing process skylight algorithm 30 and point fix extraction algorithm 40. Further, it is contemplated that additional validation or filtering between light candidates and skylight candidates may be employed after the filtering to remove false positives. The input image 500 of FIG. 4A is shown in FIG. 8A as having been processed by the illumination-invariant feature detection function 60. The feature candidates have been detected at a much higher sensitivity than without the illumination-invariant feature detection function 60. Likewise, the input image 502 of FIG. 4B is shown in FIG. 8B as having been processed by the illumination-invariant feature detection function 60. Again, the sensitivity of the detection has increased for feature candidates.

Figure 6:
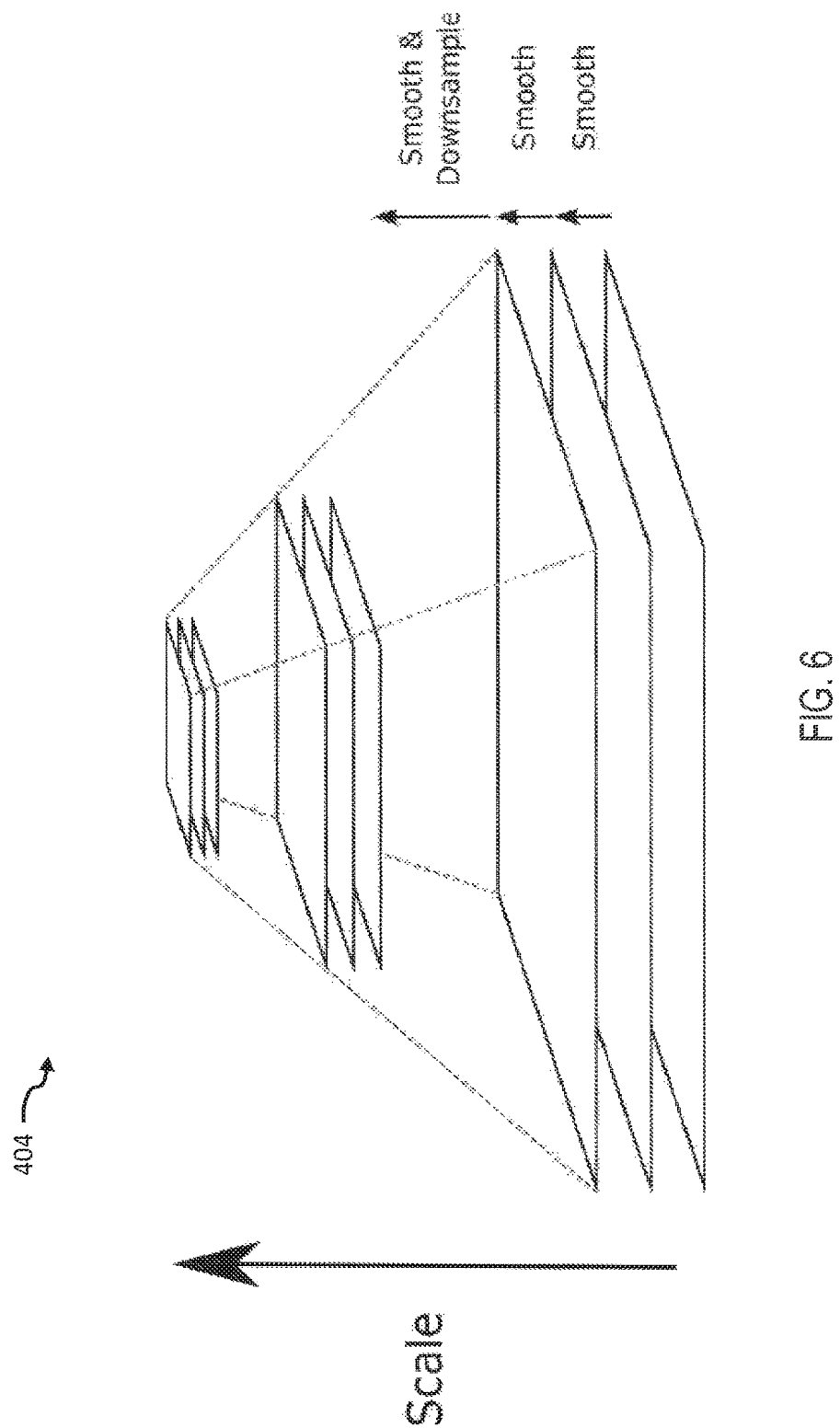
FIG. 6 schematically depicts a scale space pyramid according to one or more embodiments shown and described herein.

Referring collectively to FIGS. 2, 6 and 9, at the completion of the feature detection function 22, which may be implemented as an illumination-invariant feature detector 60, low-level candidate features 416 and 426 are made available for further processing, for example, by the process round lights function 26 and process skylights function 30. In some embodiments a feature classification step 24 may be employed to further distinguish between low-level candidate features corresponding to other ceiling light types 114, such as merged lights. Additionally or alternatively, the feature classification step 24 may be employed to classify undesirable false positive feature candidates, such as those caused by reflections, as a noise class and thereafter discard these from contention for further processing. The feature classification step 24 may be implemented as a trained classifier using statistical and machine-learning techniques and may incorporate or exist in addition to the classifier process described for the filter keypoints function 412.

Referring collectively to FIGS. 3, 10, 11, and 12, a flow chart of a sequence of functions for the process skylights function 30 is schematically depicted. It is noted that, while the functions are enumerated and performed in a particular sequence in the depicted embodiment, the functions can be performed in an alternative order without departing from the scope of the present disclosure. Input to the process skylights function 30 can be skylight candidate regions 426 in the form of oriented bounding rectangles. The skylight candidate regions 426 can be located by the illumination-invariant feature detection algorithm 60. The output from the process skylights function 30 can be skylight features which may consist of centerline features, and alternatively or additionally, skylight panel corners 130 or point fix features. These skylight features may eventually form part of the set of features 54 reported to the remainder of the EBL localization algorithm to determine the position of the vehicle 100 inside the warehouse 110.

Figure 11:
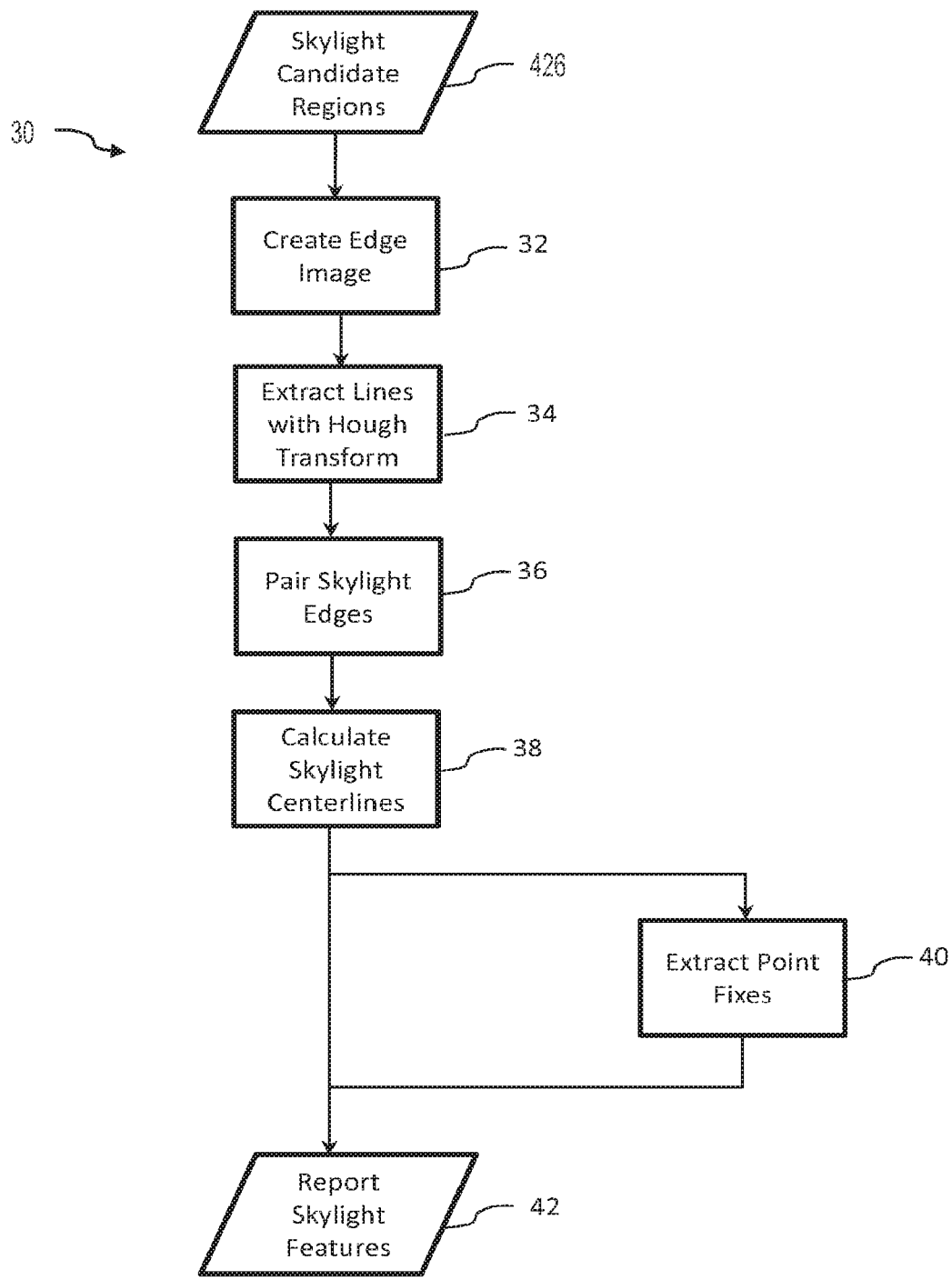
FIG. 11 depicts a flowchart of an exemplary algorithm for skylight extraction according to one or more embodiments shown and described herein.
Figure 12:
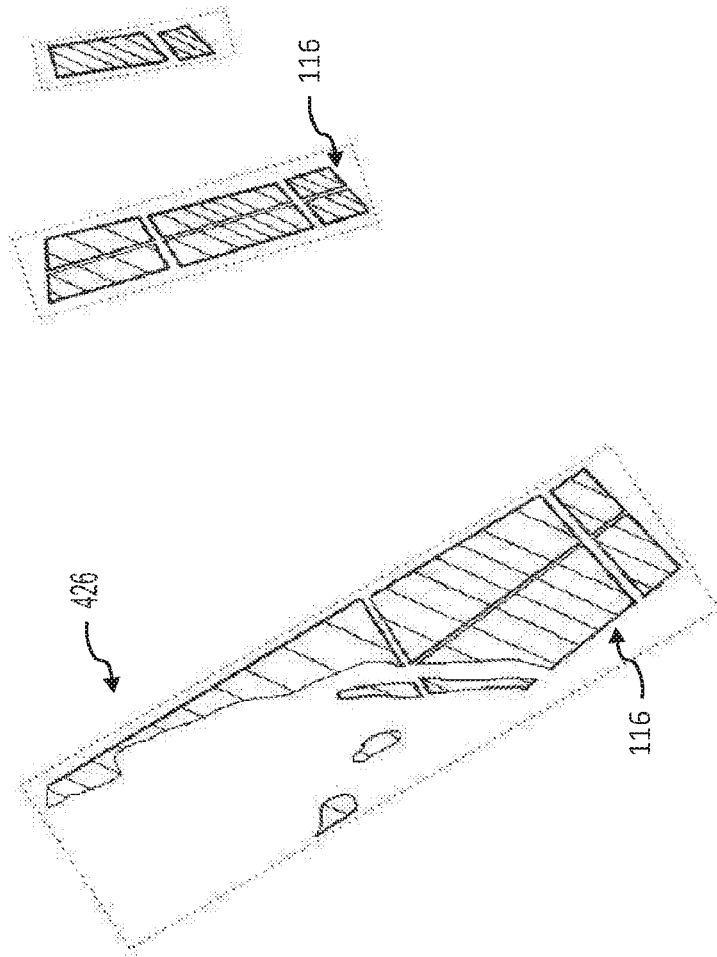
FIG. 12 schematically depicts oriented bounding boxes over skylight images overlaid upon the input image of FIG. 3 according to one or more embodiments shown and described herein.
Figure 13:
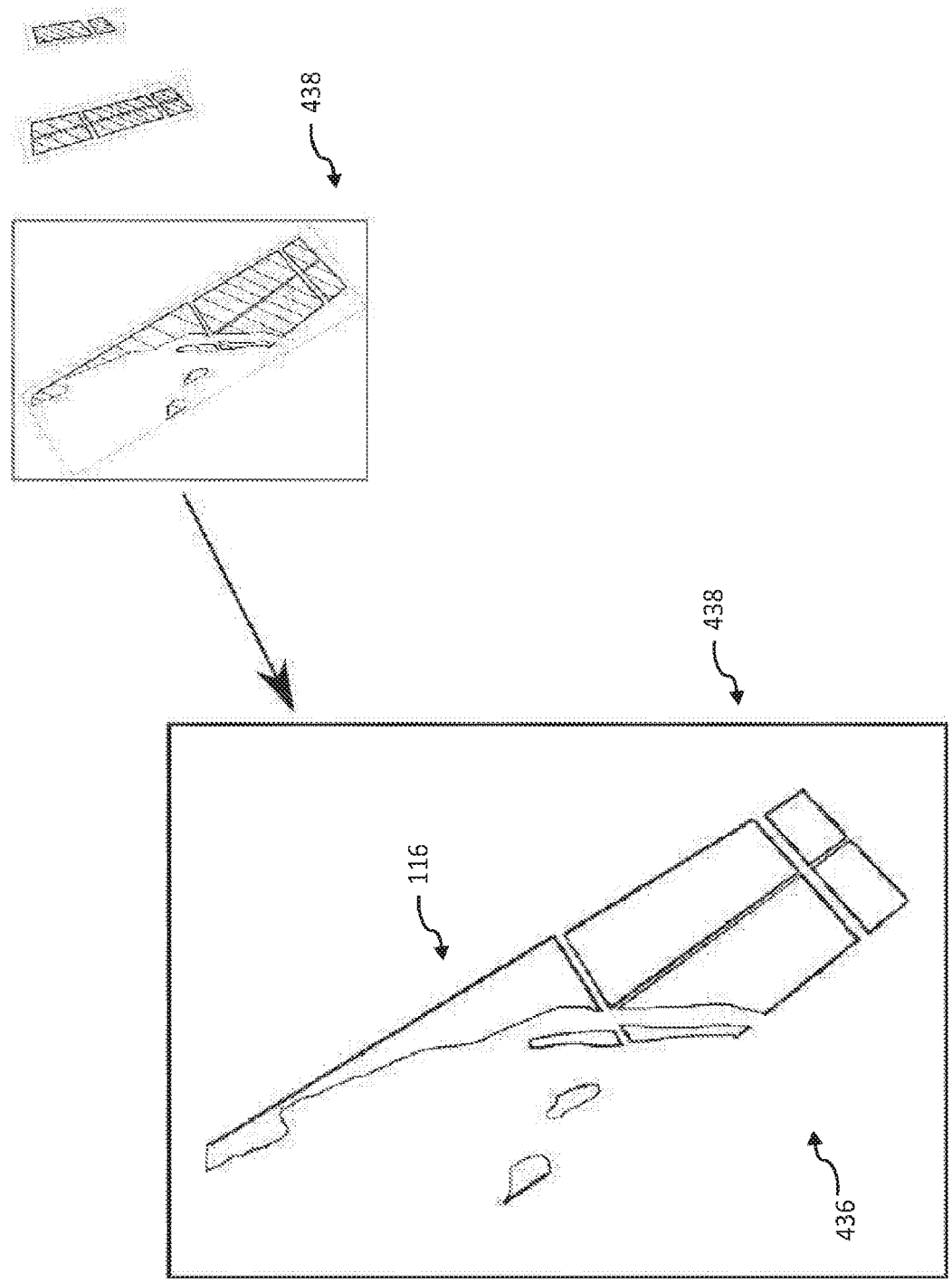
FIG. 13 schematically depicts an axis-aligned region of interest over skylight images overlaid upon the input image of FIG. 3 according to one or more embodiments shown and described herein.

Referring collectively to FIGS. 11-15, the process skylights function 30 can comprise a create edge image function 32 for transforming oriented bounding boxes 426 into binary edge images 436. The oriented bounding boxes are the skylight candidate regions 426 located by the illumination-invariant feature detection algorithm 60, and may be oriented at any angle. The create edge image function 32 can comprise any algorithm capable of repeatable transformation of the bounding boxes 426 into binary edge images 436. In one embodiment, an axis-aligned bounding box 438 is fit to the oriented bounding rectangle 426 that is the candidate region as depicted in FIG. 11. The axis-aligned bounding boxes 438 are the smallest axis-aligned rectangles that contain the four corners of the oriented bounding boxes 426. Each axis-aligned bounding box 438 can be used to crop the original full-size image into a series of smaller images; one for each skylight candidate region 426. Using sub-images instead of the full-size image helps improve computational efficiency by reducing the number of pixels to be processed in subsequent image processing operations. Each sub-image is then transformed into a binary edge image 436. The binary edge image 436 is a suitable form to input into a Hough transform algorithm. The edge image 436 is created using the Canny edge detection algorithm, but may be produced with an equivalent method for producing binary edge images 436.

In some embodiments, it may be beneficial to the quality of the edge images 436 if long bounding boxes 426, detected from skylights 116 extending across a substantial proportion of the input image 200, are split into two or more bounding boxes 426 prior to the execution of create edge image function 32. For example, in the case of the Canny edge detection algorithm the low and high thresholds may not be suitable for generating a good edge image 436 if there is significant variation in the brightness of the skylight 116 across its length. Splitting large bounding boxes 426 into two or more smaller bounding boxes improves the locality of subsequent processing in the create edge function 32.

Referring collectively to FIGS. 2, 3 and 11, in some embodiments the x- and y-gradient images of the input image 200 can be calculated during the create edge image 32 using a first order derivative operator, such as the Sobel operator. These gradient images are necessary for the Canny edge detection algorithm but, alternatively or additionally, can be used to calculate the gradient magnitude and orientation images which may be preserved for use in processing operations, including but not limited to filtering operations, in subsequent stages of the process skylights function 30 or CFE algorithm 10. For example, the gradient magnitude and orientation images can be used to reason about the strength and direction of lines detected in the Hough transform line extraction function 34 and therein assist in the removal of inaccurate or otherwise undesirable lines.

Referring collectively to FIGS. 11-16A, the process skylights function 30 can comprise a Hough transform line extraction function 34 for determining edge lines 434 from the binary edge images 436. Each edge image 436 is processed by the Hough transform line extraction function 34 to find edge line segments 434. The skylight candidate region 426 corresponding to the edge image 436 can be used to help setup the Hough transform to predispose the extraction function 34 to return edge lines 434 along the longitudinal edges of the skylights 116. Specifically, the angle of the longer edges of the skylight candidate regions 426 can be calculated and a restricted range about this angle can be thresholded for in the gradient orientation image to create a binary image mask. The mask can be applied to the binary edge image 436 so that pixels on edges with gradient orientation too dissimilar to the desired longitudinal edge lines are suppressed and not input to the Hough transform. This increases computational efficiency as there are fewer pixels to process in the voting stage of the Hough transform and additionally improves the quality of output lines, for example by suppressing lines that are in substantially perpendicular orientation to the required lines, thereby reducing the need for further line filtering stages after the Hough transform function 34. Alternatively or additionally, the angle range that each pixel is voted through in the Hough transform can be set using knowledge of the angle of orientation of the skylight candidate regions 426 which also improves computational efficiency and helps remove unwanted lines. FIG. 14A shows a possible set of line segments returned by the Hough transform with the above-described angle range restrictions; note that line segments in the substantially perpendicular orientation at the skylight panel separations have not been detected. Additionally, the Hough transform can be set to only return lines above a certain length, for example, above a set fraction of the length of the candidate region bounding rectangle 426, as shown in FIG. 14B, where the shorter lines of FIG. 14A have been removed.

Figure 15:
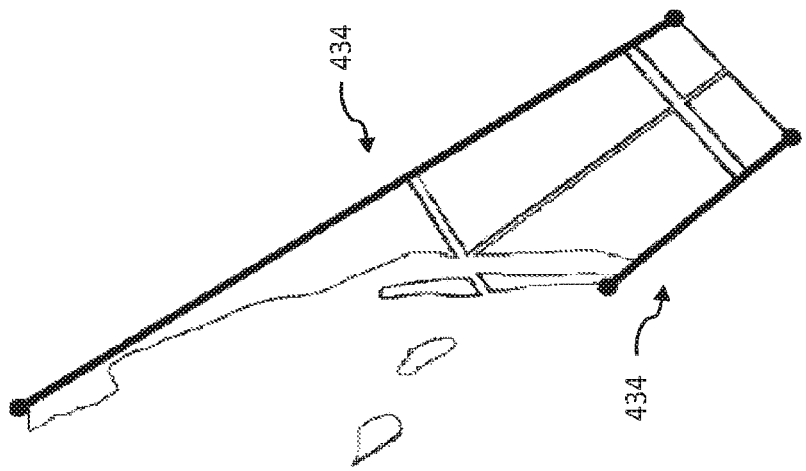
FIG. 15 schematically depicts line segment pairing selection overlaid upon the input image of FIG. 3 according to one or more embodiments shown and described herein.

The process skylights function 30 can comprise a pair of skylight edges function 36 that takes the skylight edge line segments 434 extracted by the Hough transform line extraction function 34 as input and selects a pair of these longitudinal edge line segments 434 for each skylight 116 that can later be used to determine the centerline 250. In one embodiment, the result of the pair skylight edges function 36 is shown in FIG. 15. The longitudinal edge pairing function 36 picks the strongest line 434 as a first edge and then seeks to locate a pairing line segment 434 that is similar in angle and at distance similar to the width of the skylight candidate region 426.

Figure 14B:
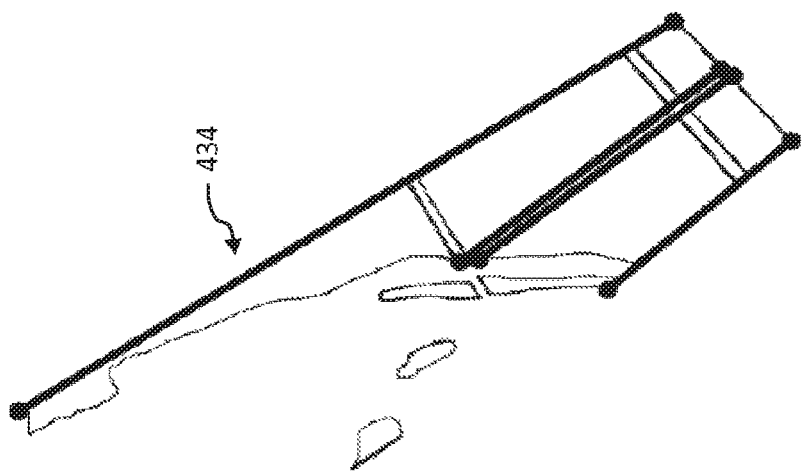
FIGS. 14A and 14B schematically depict line segment selection overlaid upon the input image of FIG. 3 according to one or more embodiments shown and described herein.
Figure 14A:
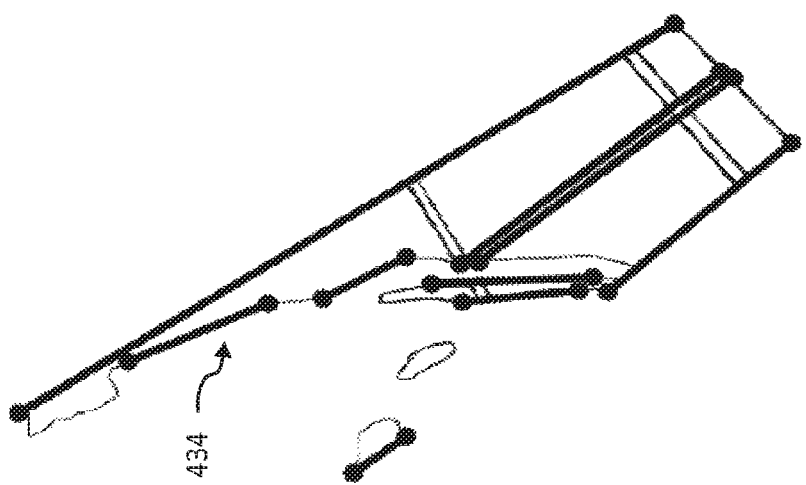

It has been found that this method may return an incorrect result on occasion; for example if the right-most longest edge segment 434 in FIG. 14B is considered to be the first edge segment 246, it may be incorrectly matched to one of the substantially parallel lines running along the middle of the skylight. Due to phenomena such as occlusion, for example causing the fractured appearance of the skylight as seen in FIGS. 14A-15, and the differences in observed size of skylights 116 within and across different warehouses 110, it may be difficult to tune parameters to always select the correct second pairing edge segment. In an alternative embodiment, the oriented bounding boxes 436 (that is, the skylight candidate regions) may be assumed to be sufficiently accurate indicators of skylight locations in the image and used to guide the line segment pairing process. Specifically, for each of the longer edges of the rectangular oriented bounding box 426, the corresponding candidate line segments 434 extracted by the Hough transform line extraction function 34 can be sorted by distance, in order of nearest to furthest, where the distance may be defined as that between the midpoint of the long edge of the oriented bounding box 426 and the intersection of a line through the midpoint of and perpendicular to the long edge of the oriented bounding box 426 with the current candidate line segment 434. Subsequently, for each long edge segment of the skylight candidate oriented bounding box 426, the respective winning candidate line segment 434 can be selected as that with minimum distance. In cases where there are multiple line segments 434 within some small distance threshold to the winning line segment, a non-max suppression routine may be performed that uses the gradient magnitude image, calculated and preserved at the create edge image function 32 stage, in which the line segment 434 with the greatest average gradient magnitude, or alternatively or additionally, the greatest cumulative gradient magnitude along the line is selected. In this embodiment, the longitudinal edge pairing function 36 is more likely to consistently select and pair the outside most edge segments as shown in FIG. 15.

Referring collectively to FIGS. 2, 11, and 14A-16B, the process skylights function 30 can comprise a centerline calculating function 38 for calculating a centerline 250 of each skylight 116 from the two edge lines selected by the longitudinal edge pairing function 36. Specifically, a first edge line 246 and a second edge line 248, as selected by the edge pairing function 36, can be utilized to derive the centerline 250 for each skylight 116.

The centerline 250 can be calculated based upon the first edge line 246 and the second edge line 248. For the sake of clarity, it is noted that each of the first edge line 246 and the second edge line 248 and the resultant centerlines 250 can be specified as line segments (FIG. 9B) or as infinite lines (FIG. 9A). The method for finding the centerline is similar for either case—if the first edge line 246 and second edge line 248 are provided as line segments, they can be extrapolated and treated as infinite lines.

Figure 17:
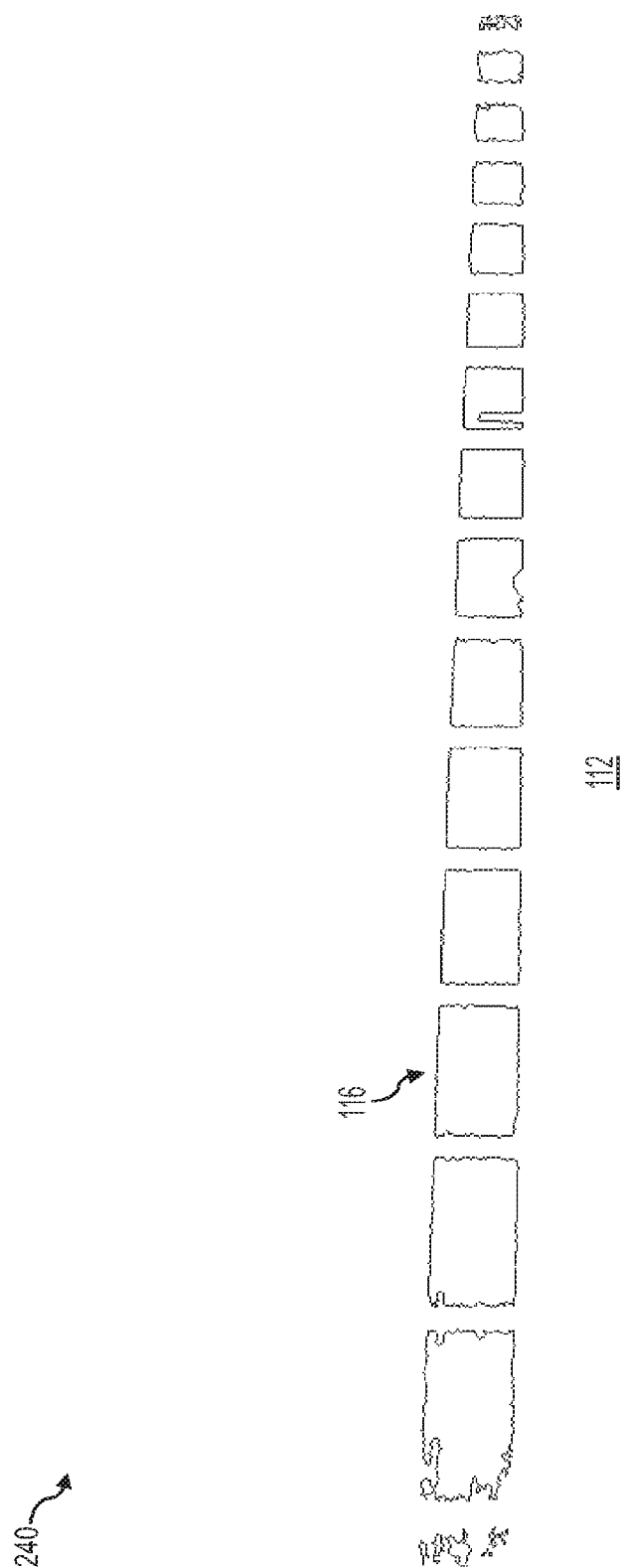
FIG. 17 schematically depicts an input image showing a row of skylights according to one or more embodiments shown and described herein.
Figure 18:
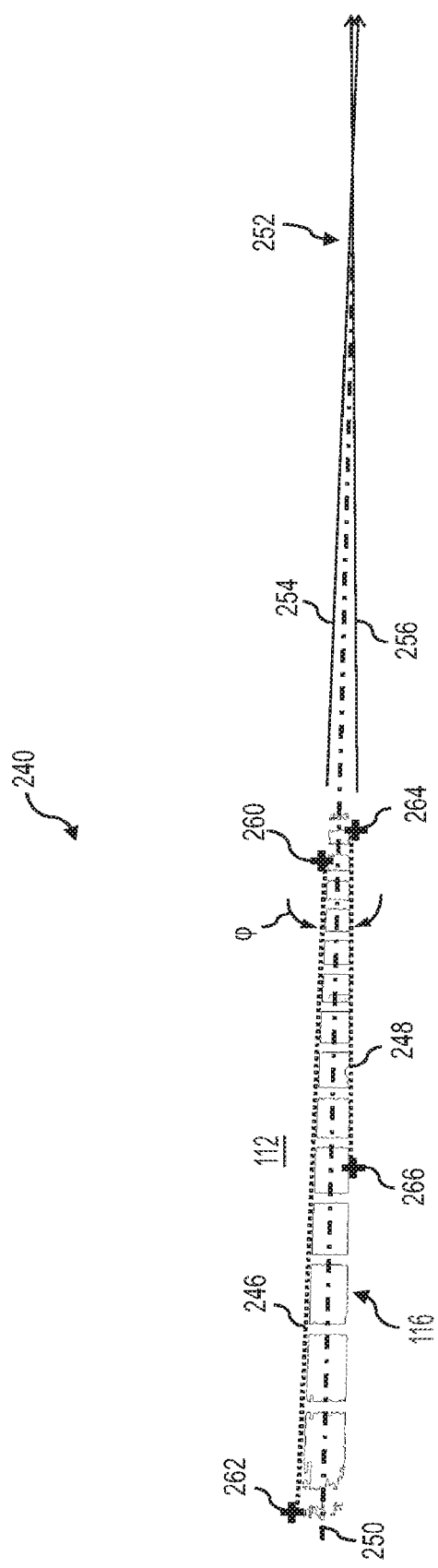
FIG. 18 schematically depicts edge lines of the input image of FIG. 17 according to one or more embodiments shown and described herein.

Referring collectively to FIGS. 2, 11, 17 and 18, as described in detail above, an input image 240 of a ceiling 112 with skylights 116 can be provided. It is noted that the skylights 116 are represented in FIGS. 17 and 18 as borders of detected raw skylight features for clarity. The input image 240 can be analyzed to determine a first edge line 246 and a second edge line 248 of the skylights 116. For example, the CFE algorithm 10, specifically the process skylights function 30 stages through to the longitudinal edge pairing function 36, can be utilized to extract the first edge line 246 the second edge line 248, and associated end points from the input image 240. The first edge line 246 and the second edge line 248 are depicted in FIG. 18 as being overlaid upon the skylights 116. The first edge line 246 and the second edge line 248 can be longitudinal edge line segments that extend longitudinally along the skylights 116. When extrapolated beyond the depicted longitudinal segments, the first edge line 246 and the second edge line 248 can converge at a vanishing point 252, which is located off of the input image 240 of FIG. 17. Specifically, the first edge line 246 can be extended by a first extrapolating ray 254 that is aligned with the first edge line 246. The second edge line 248 can be extended by a second extrapolating ray 256 that is aligned with the second edge line 248. Each of the first extrapolating ray 254 and the second extrapolating ray 256 can be extended to at least the vanishing point 252 to represent the convergence of the first edge line 246 and the second edge line 248.

The centerline 250 of the skylights 116 can be disposed between the first edge line 246 and the second edge line 248. In some embodiments, the centerline 250 can be represented as a continuous line that originates at the vanishing point 252 of the first edge line 246 and the second edge line 248 at an angle that bisects the first edge line 246 and the second edge line 248. Specifically, the first edge line 246 and the second edge line 248 can be oriented with respect to one another at an angle φ. Accordingly, the angle of the centerline 250 can be about half of the angle φ measured from the first edge line 246 or the second edge line 248. It is noted that the first extrapolating ray 254 and the second extrapolating ray 256 are provided herein primarily for clarifying the location of the vanishing point 252. Accordingly, it should be understood that the embodiments described need not make use of such rays for determining the vanishing point 252. Indeed, it may be preferred to determine the location of the vanishing point 252 directly from the first edge line 246 and the second edge line 248.

Referring collectively to FIGS. 17-19A, the skylight 116 centerlines 250 as described as above in the form of infinite lines can be reported directly to the EBL as features to assist in the localization and, alternatively or additionally, navigation of the vehicle 100 or, alternatively or additionally can be transformed into centerline segments. Referring to FIG. 19A, the first end point 260 and second end point 262 of the first edge line segment 246 can be projected onto the infinite line representation of centerline 250 in FIG. 18. Similarly the first edge point 264 and second edge point 266 of the second edge line segment 248 can be projected onto the centerline 250. The projected end points of the first edge line 246 and the projected end points of the second edge line 248 can be paired based upon proximity to the vanishing point 252. Specifically, the nearest projected end points to the vanishing point 252, in this case the projections of the first end point 260 of the first edge line 246 and the first end point 264 of the second edge line 248, can be paired and averaged to find the first end point 282 demarcating one end of the centerline segment 250. Accordingly, the furthest projected end points to the vanishing point 252, in this case the projections of the second end point 262 of the first edge line 246 and the second end point 266 of the second edge line 248, can be paired and averaged to find the second end point 284 demarcating the other end of the centerline segment 250.

Figure 16A:
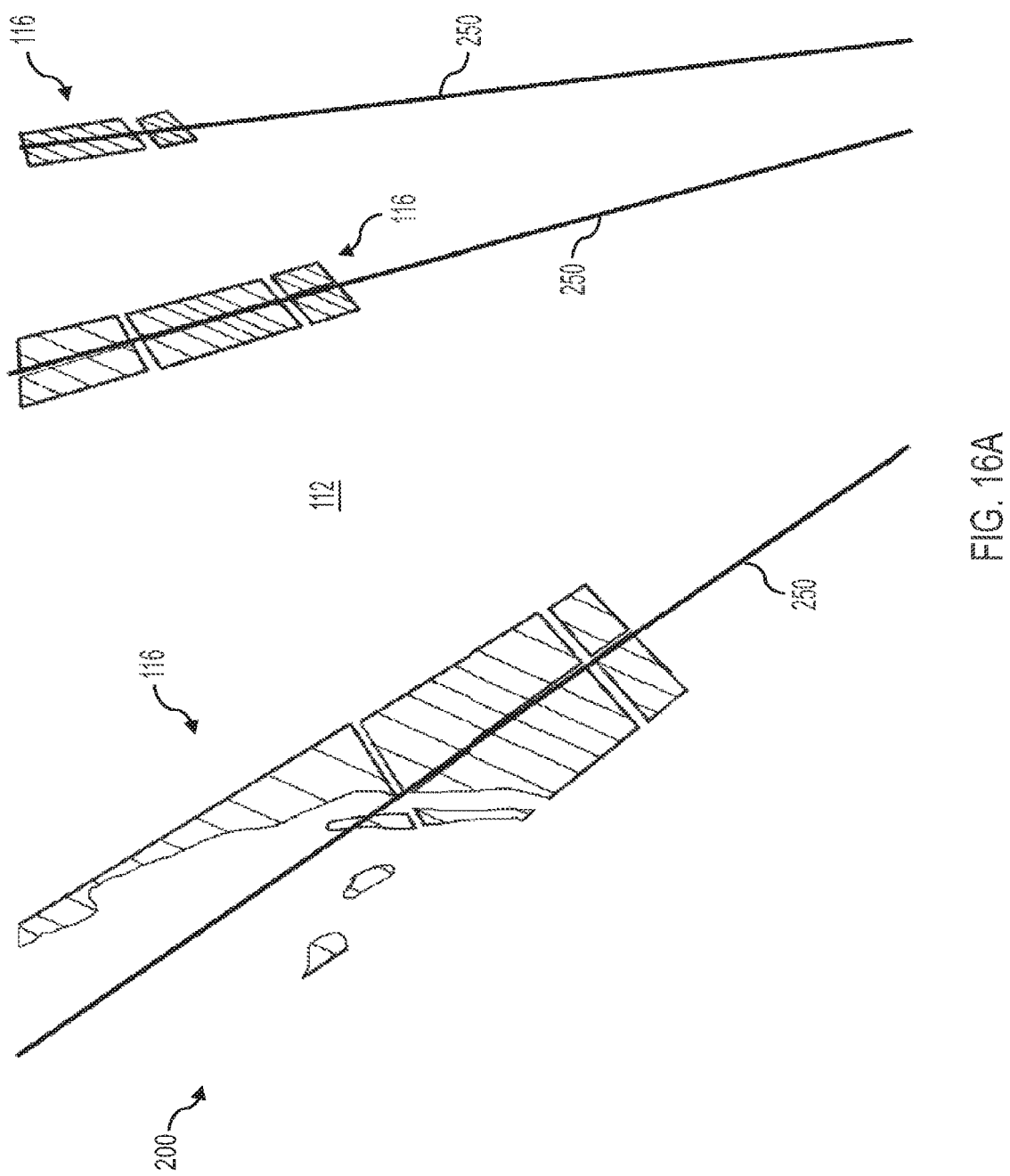
FIGS. 16A and 16B schematically depict centerline features overlaid upon the input image of FIG. 3 according to one or more embodiments shown and described herein.
Figure 16B:
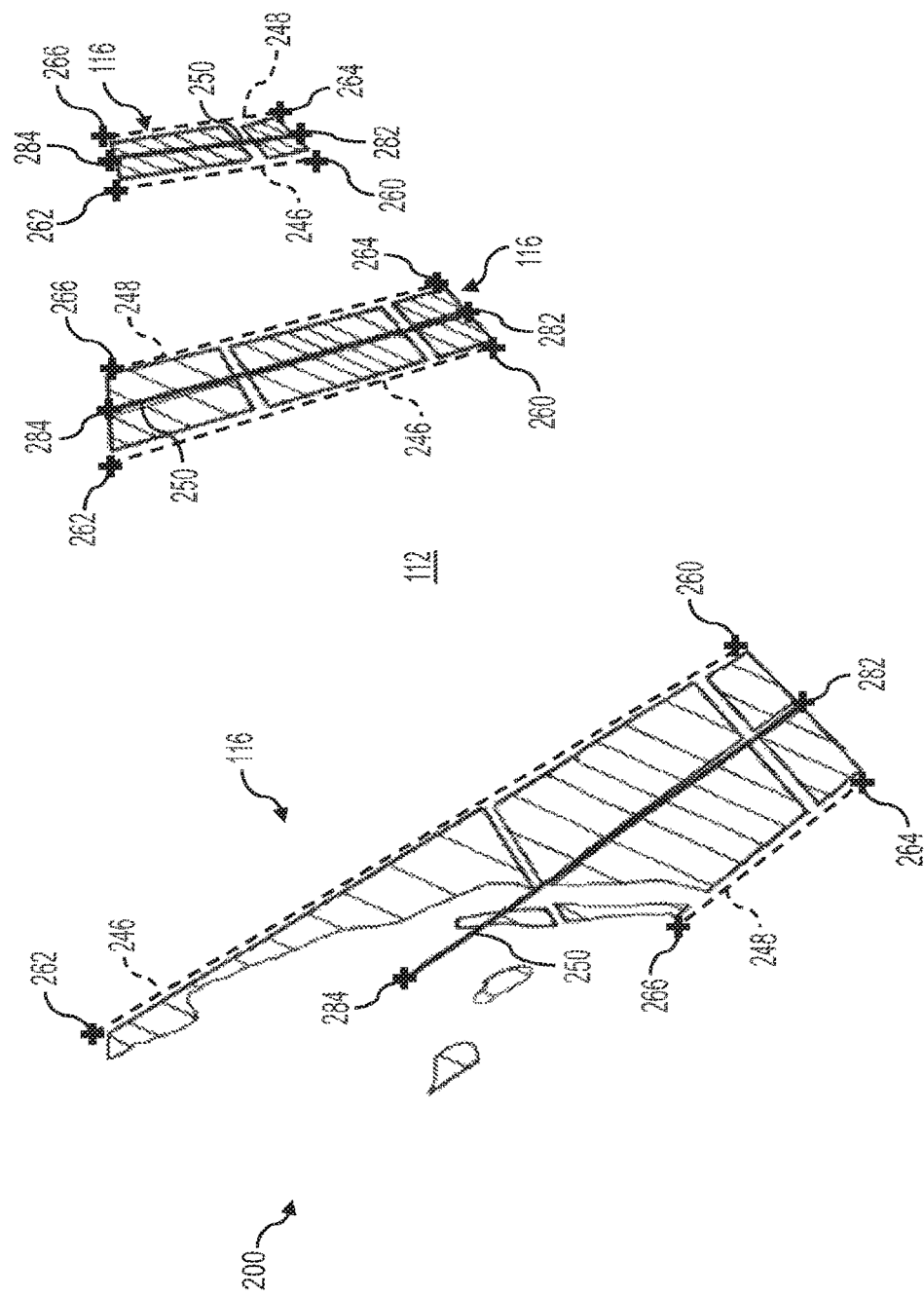

Referring to FIG. 16B, the result of the process described above for the centerline calculating function 38 is shown for the example image 200 introduced in FIG. 3. The centerline 250 can be determined from the paired end points. Specifically, the centerline 250 can be a line segment demarcated by a first end point 282 and a second end point 284. The first end point 282 of the centerline 250 can be determined from the first end point 260 of the first edge line 246 and the first end point 264 of the second edge line 248, which as noted above can be paired. The second end point 284 of the centerline 250 can be determined from the second end point 262 of the first edge line 246 and the second end point 266 of the second edge line 248, which can also be paired. In some embodiments, the first end point 282 and the second end point 284 of the centerline 250 can be determined by averaging each of the respective pairs of end points of the first edge line 246 and the second edge line 248.

Referring collectively to FIGS. 16A-16B, the centerline 250, the first edge line 246, the second edge line 248, the corresponding Hough coordinates (for infinite lines), the corresponding end points (for line segments), or combinations thereof of each of the skylight candidate regions 426 can be associated with one of the skylights 116, and the EBL can be utilized to provide features for navigation of the vehicle or can be presented by a display communicatively coupled to the EBL. It is noted that there are a number of parameters (e.g. thresholds) that can be configured for each function of the CFE algorithm according to the particular site that is being navigated by the vehicle. Accordingly, the embodiments described herein can further include a calibration stage for determining the precise values for the parameters.

Referring collectively to FIGS. 1, 17 and 19A, the embodiments described herein may be utilized in environments with various types and amounts of ceiling lights 114. For example, the ceiling 112 of the warehouse 110 can have an insufficient number of round lights 118 or merged lights 120 for use as features for navigation. For example, the input image 240 may not include any round lights 118 or merged lights 120. It has been discovered that the EBL may have decreased accuracy when provided with a feature set missing complementary point features extracted from round lights 118 or merged lights 120. That is, the centerline 250 extracted from the skylights 116 may not fully constrain the localization of the vehicle 100 and lead to inaccurate solutions. For example, the EBL may be unable to accurately determine how far along the centerline 250 the vehicle 100 is positioned.

Referring collectively to FIGS. 1 and 11, the skylights 116 can span a section of the ceiling 112 and be arranged substantially along a row 128. In some embodiments, the process skylights function 30 can be modified such that in addition to extracting centerline features from the skylights 116 as an EBL feature, the process skylights function 30 can further comprise a point fix function 40 for extracting point fix features. For example, point fix features can be extracted from the corners 130 of the skylights 116. The point fix features can enable the EBL to perform accurately for skylight-heavy, round-light sparse sites. Accordingly, instead of directly reporting the centerline features 250 to the EBL following determination, the process skylights function 30 can extract point fix features using the centerline and edge line features as input.

Figure 20:
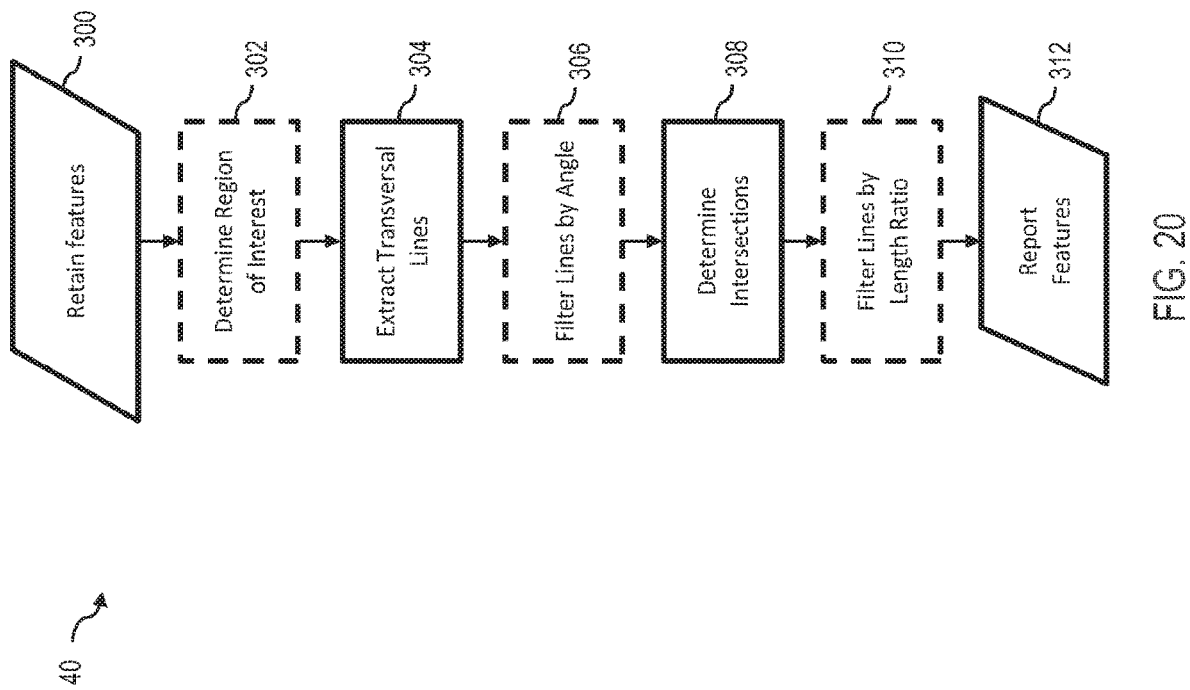
FIG. 20 depicts a flowchart of an exemplary algorithm for extracting point fixes according to one or more embodiments shown and described herein.
Figure 21A:
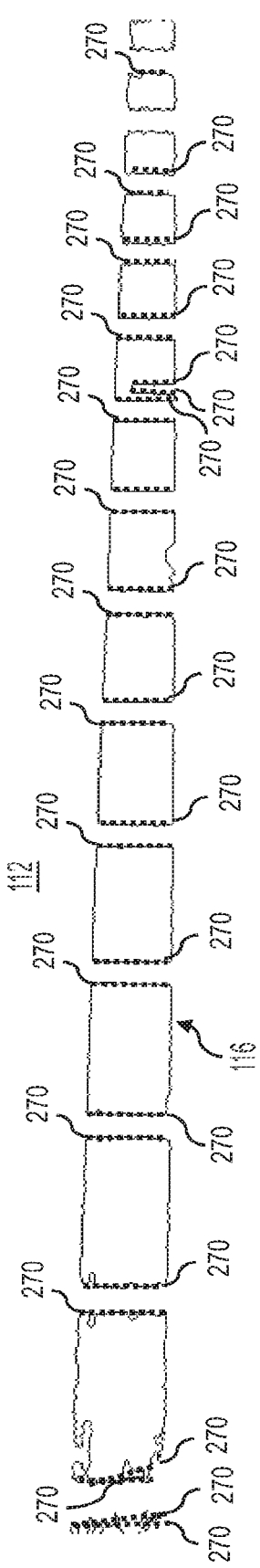
FIGS. 21A and 21B schematically depict transversal edges of the input image of FIG. 17 according to one or more embodiments shown and described herein.
Figure 21B:
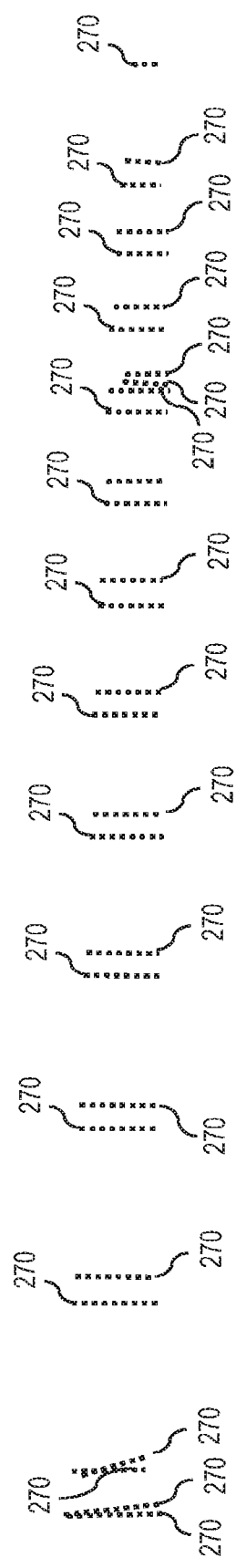
Figure 22A:
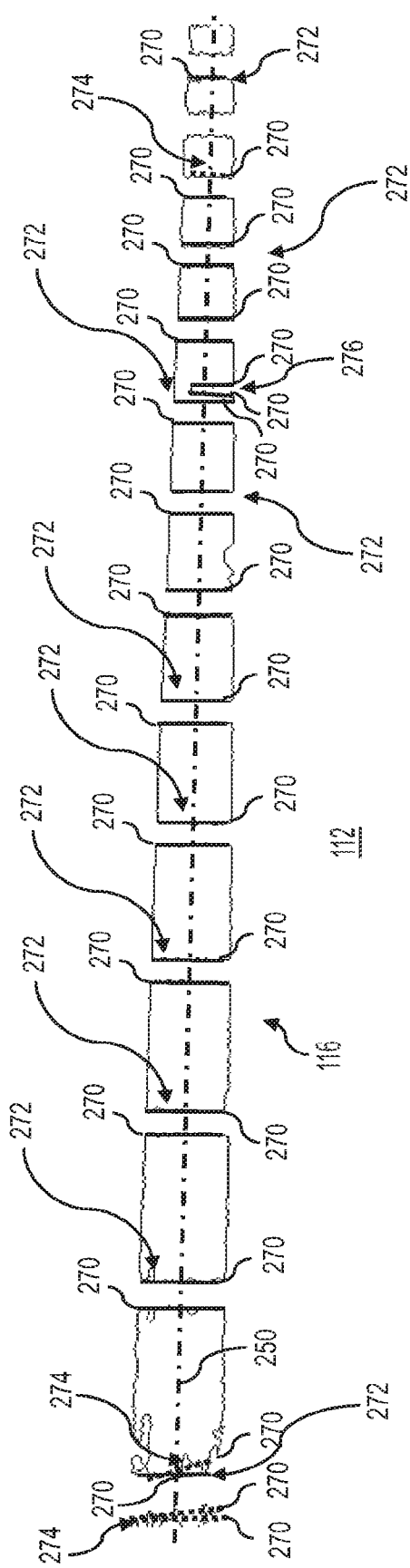
FIGS. 22A and 22B schematically depict usable and unusable edges of the transversal edges of FIGS. 21A and 21B according to one or more embodiments shown and described herein.
Figure 22B:
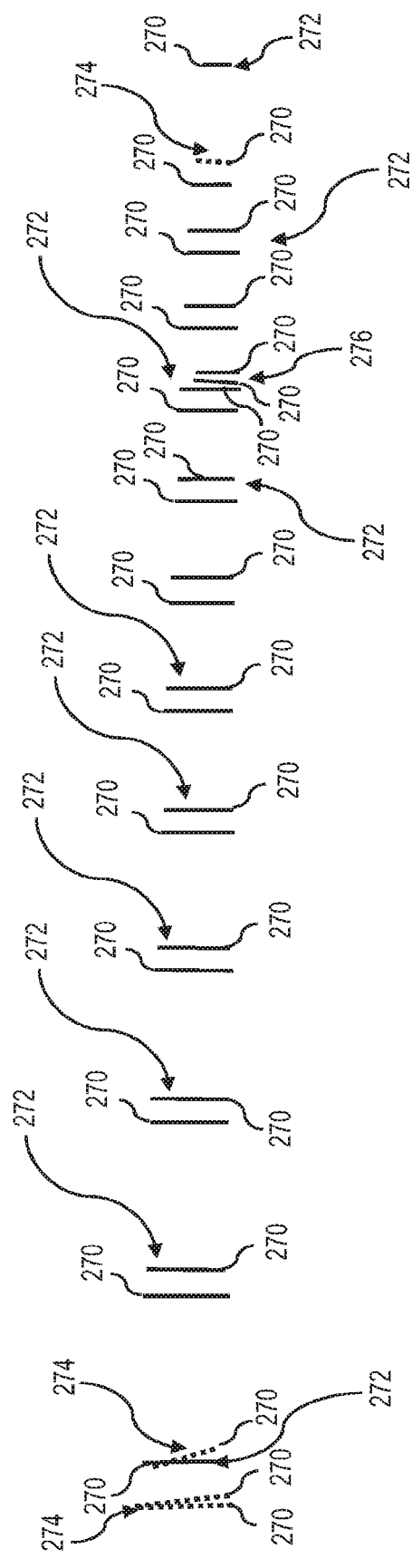

Referring now to FIG. 20, a flow chart of a sequence of functions for the point fix function 40 is schematically depicted. It is noted that, while the functions are enumerated and performed in a particular sequence in the depicted embodiment, the functions can be performed in an alternative order without departing from the scope of the present disclosure. Specifically, in some embodiments, it may be desirable to switch the order of the angle filtering function 306 and the length filtering function 310. In some embodiments, the angle filtering function 306 can be performed prior to the intersection function 308. It is furthermore noted that one or more of the functions can be omitted without departing from the scope of the embodiments described herein. Specifically, the angle filtering function 306, the length filtering function 310, or both the angle filtering function 306 and the length filtering function 310 can be omitted. Furthermore, it is noted that the region of interest function 302 can be omitted without departing from the scope of the embodiments described herein. Alternatively or additionally, the point fix function 40 can be performed independent of the CFE algorithm 10 and the process skylights function 30. For example, input for the point fix function 40, which is described in greater detail herein, can be provided via equivalent processes that are performed at a different time, via a different processor as the point fix function 40, or both.

Referring collectively to FIGS. 11, 19A and 20, at step 300 the point fix function 40 can receive input features such as, for example, the first edge line 246, the second edge line 248, the centerline 250 of the skylights 116, or combinations thereof. As is noted above, each of the first edge line 246, the second edge line 248, the centerline 250 can be provided as line segments. Accordingly, the first edge line 246 can be demarcated by a first end point 260 and a second end point 262. The second edge line 248 can be demarcated by a first end point 264 and a second end point 266. The centerline 250 can be demarcated by a first end point 282 and a second end point 284.

Referring collectively to FIGS. 11, 18 and 20, each of the first edge line 246, the second edge line 248, and the centerline 250 can be provided as line segments. In some embodiments, the first edge line 246, the second edge line 248, the centerline 250, and the vanishing point 252 of the skylights 116 can be provided by the process skylights function 30 after the centerline calculating function 38 is performed. Alternatively or additionally, the first edge line 246, the second edge line 248, the centerline 250, and the vanishing point 252 of the skylights 116 can be provided via a separate process and provided as direct input.

Referring collectively to FIGS. 19A-20, the point fix function 40 can comprise a region of interest function 302 for selecting a usable portion of the skylights 116 for determining point fix features. The region of interest function 302 can be utilized to increase the accuracy and efficiency of the point fix function 40. For example, it has been discovered that in sites with relatively high ceiling heights and long rows of lights, the extracted centerlines may not fit to the center of the light across the whole image. Such errors may be caused by image distortion due to the camera lens, poor selection of edge segments to calculate the extracted centerline, or both. It has furthermore been discovered that the accuracy of the point fix function 40 can be increased by restricting the area of the skylights 116 with the region of interest function 302.

Generally, the region of interest 258 can be set to be coincident with a usable portion of the skylights 116, i.e., the area bounded by the region of interest 258 includes a subset of the skylights 116. In some embodiments, the region of interest 258 can be determined using the centerline 250 as a reference. Specifically, the centerline 250 can be utilized as an axial datum for the determination of the region of interest 258. For example, the region of interest 258 can be generated by a bounding box that is axis aligned with the centerline 250 and demarcated by the end points of the first edge line 246 and the second edge line 248 that bound the largest region. Accordingly, the region of interest 258 can be demarcated by the second end point 262 of the first edge line 246 and the first end point 264 of the second edge line 248, such that opposing corners of the region of interest 258 are set to the second end point 262 of the first edge line 246 and the first end point 264 of the second edge line 248.

Alternatively or additionally, a region of interest 259 that is more restrictive than the region of interest 258 can be determined using the centerline 250 as a reference. Specifically, the first end point 282 and the second end point 284 of the centerline 250 can be projected upon the first edge line 246 and the second edge line 248 to create intersection points 286. Optionally, the first edge line 246 and the second edge line 248 can be extrapolated to determine the intersection points 286. Accordingly, the region of interest 259 can be demarcated by one or more of the intersection points 286. Specifically, opposing corners of the region of interest 259 can be set to any two of the intersection points 286 such as, but not limited to, the intersection points 286 that result in the largest area, the intersection points 286 that result in the smallest area, or the intersection points 286 that result in each of the intersection points 286 being coincident with the region of interest 259.

Referring collectively to FIGS. 18 and 19B, the region of interest 258 can be determined using the vanishing point 252, the first edge line 246, and the second edge line 248. For example, the region of interest 258 can be determined by calculating the distance between endpoints of the first edge line 246 and the second edge line 248 with respect to the vanishing point 252. Specifically, the first end point 260 of the first edge line 246 can be closer to the vanishing point 252 than the second end point 262 of the first edge line 246. The first end point 264 of the second edge line 248 can be closer to the vanishing point 252 than the second end point 266 of the second edge line 248.

In some embodiments, the region of interest 258 can be set between end points of the first edge line 246, and the second edge line 248 that are the maximum distance from the vanishing point 252 and minimum distance from the vanishing point 252. Specifically, as depicted in FIG. 18, the second end point 262 of the first edge line 246 can be the end point of the first edge line 246 and the second edge line 248 that is the maximum distance from the vanishing point 252. The first end point 264 of the second edge line 248 can be the end point of the first edge line 246 and the second edge line 248 that is the minimum distance from the vanishing point 252. Accordingly, the region of interest 258 can be demarcated by the second end point 262 of the first edge line 246 and the first end point 264 of the second edge line 248. For example, the region of interest 258 can bound a substantially rectangular area that is coincident with the skylights 116, such that opposing corners of the region of interest 258 are set to the second end point 262 of the first edge line 246 and the first end point 264 of the second edge line 248.

Referring again to FIGS. 18-19B, a region of interest 268 can be demarcated by an overlapping portion of the first edge line 246 and the second edge line 248. Generally, the region of interest 268 is the most restrictive region of interest described herein. The overlapping portion can be defined by the end points of the first edge line 246 and the second edge line 248. In some embodiments, the region of interest 268 can be defined by an axis aligned bounding box that is demarcated by the end points of the first edge line 246 and the second edge line 248 that result in the smallest area. Accordingly, the region of interest 268 can include the overlapping portion demarcated by the first end point 260 of the first edge line 246 and the second end point 266 of the second edge line 248.

Alternatively or additionally, the region of interest 268 can be determined utilizing the vanishing point 252. Specifically, each of the first edge line 246 and the second edge line 248 can each have a proximal end point nearest the vanishing point 252, depicted in FIG. 18 as the first end point 260 and the first end point 264. Each of the first edge line 246 and the second edge line 248 can have a distal end point furthest from the vanishing point 252, depicted in FIG. 18 as the first end point 260 and the first end point 264. The region of interest 268 can be demarcated by the proximal end point furthest from the vanishing point 252 and the distal end point nearest the vanishing point 252. Specifically, as depicted in FIG. 18, the first end point 260 of the first edge line 246 can be selected as the proximal end point furthest from the vanishing point 252. The second end point 266 of the second edge line 248 can be selected as the distal end point nearest the vanishing point 252.

Referring collectively to FIGS. 19B-21B, the point fix function 40 can comprise a transversal line extraction function 304 for extracting transversal edges 270 from the skylights 116. The transversal line extraction function 304 can comprise the feature extraction algorithm, described herein above, such as, but not limited to, the Hough Transform. The transversal line extraction function 304 can be configured to extract line segments from the skylights 116 that have a vertical component with respect to the centerline 250. That is the extracted line segments can be characterized by a vector having a component that is substantially orthogonal to the centerline 250. For example, the Hough transform can be applied with appropriate parameters to detect transversal edges 270 of the skylights 116.

In some embodiments, the transversal edges 270 that are coincident with the region of interest 258 can be preferred. For example, the transversal line extraction function 304 may only extract lines from the portion of the skylights 116 that are within the region of interest 258. Alternatively or additionally, the transversal line extraction function 304 may operate on skylights 116 outside of the region of interest 258 and filter the extracted lines to obtain only transversal edges 270 that are coincident with the region of interest 258. Accordingly, the transversal edges 270 of the portion of the skylights 116 that are coincident with the region of interest 258 can be detected by the transversal line extraction function 304. It is noted that, for clarity, the transversal edges 270 are depicted as being overlaid upon the skylights 116 in FIG. 21A and the transversal edges 270 are depicted in isolation in FIG. 21B.

Referring collectively to FIGS. 11, 12, 13, 19B, 20, 21A and 21B, in embodiments where the transversal line extraction function 304 comprises the Hough transform, the skylight candidate region 426 corresponding to the binary edge image 436 input to the Hough transform can be used to help setup the Hough transform to predispose the transversal line extraction function 304 to return transversal edges 270 substantially orthogonal to the centerline 250. Specifically, this process is similar to that used to help setup the Hough transform used in the Hough transform line extraction function 34 comprised in the process skylights function 30 to be predisposed to extracting edge lines along the longitudinal edges of the skylights 116. If the gradient orientation image has been calculated and preserved in the create edge images function 32, or alternatively or additionally provided via a separate process and provided as direct input, a restricted angle range centered around the angle of the shorter edges of the skylight candidate region 426 can be thresholded for in the gradient orientation image to create a binary image mask. The mask can be applied to the binary edge image 436 so that pixels on edges with gradient orientation substantially dissimilar to the desired transversal edge lines 270 are suppressed and not input to the Hough transform. This increases the computational efficiency of the transversal line extraction function 304 as there are fewer pixels to process in the voting stage of the Hough transform and additionally improves the quality of the output lines, for example by suppressing lines that are of substantially perpendicular orientation to the required lines, thereby reducing the need for further line filtering stages after the transversal line extraction function 304. Alternatively or additionally, the angle range that each pixel is voted through in the Hough transform can be set using knowledge of the angle of orientation of the shorter edges of the skylight candidate regions 426 which also improves computational efficiency and helps remove unwanted lines. It is noted that in the above description utilizing the angle of skylight candidate region 426 to improve the Hough transform that alternatively or additionally the angle of one of the more restrictive regions of interest 258, 259 or 268 may instead be utilized to achieve the same outcome.

Referring collectively to FIGS. 11, 12, 13, 20, 22A and 22B, in some embodiments the transversal line extraction function 304 can comprise a Hough transform and, in embodiments where the gradient orientation image has been made available by the create edge images function 32 or via a separate process, the transversal line extraction function 304 can be predisposed to return transversal edges 270 which are of the desired orientation and quality to be considered usable edges 272 for subsequent processing. Alternatively or additionally, the point fix function 40 can comprise the angle filtering function 306 for classifying the transversal edges 270 as usable edges 272 and unusable edges 274. Specifically, it is noted that, while the transversal line extraction function 304 can be configured to primarily detect transversal edges 270 within a range approximately perpendicular to the angle of the centerline 250, some incorrect or undesirable lines may be detected. Accordingly, it may be desired to remove unusable edges 274 from the transversal edges 270. The unusable edges 274 can be the transversal edges 270 having an angle with respect to the centerline 250 that is outside of a restricted range of angles on either side of the average angle of all of the transversal edges 270. Alternatively or additionally, the usable edges 272 can be the transversal edges 270 having an angle with respect to the centerline 250 that is within the restricted range of angles on either side of the average angle of all of the transversal edges 270 with respect to the centerline 250. It is noted that, for clarity, the transversal edges 270 are depicted as being overlaid upon the skylights 116 in FIG. 22A and the transversal edges 270 are depicted in isolation in FIG. 22B.

Figure 23:
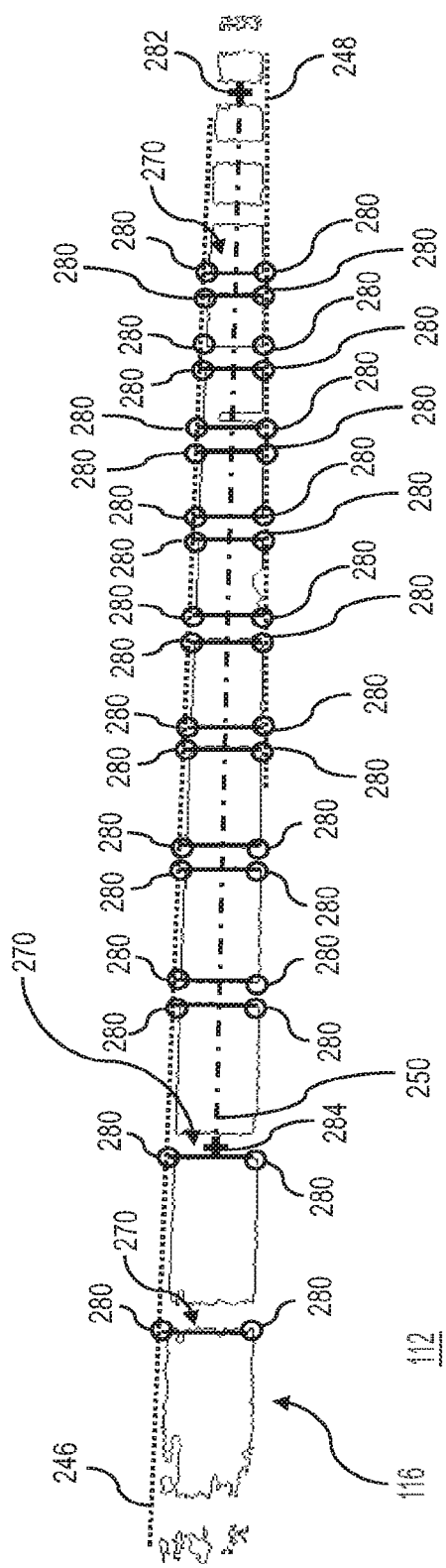
FIG. 23 schematically depicts point fixes overlaid upon the input image of FIG. 17 according to one or more embodiments shown and described herein.

Referring collectively to FIGS. 20 and 23, the point fix function 40 can comprise the intersection function 308 for determining points of convergence between the transversal edges 270 and the first edge line 246, the transversal edges 270 and the second edge line 248, or both. In embodiments where the transversal edges 270 are classified as usable edges 272, the transversal edges 270 that are classified as usable edges 272 can be utilized to determine points of convergence. The points of convergence can be determined by extrapolating the transversal edges 270. Specifically, the transversal edges 270 can be extrapolated by extending each of the transversal edges 270 along their length at least until the extrapolation intersects with the first edge line 246, the second edge line 248 or both the first edge line 246 and the second edge line 248. Optionally, the first edge line 246 and the second edge line 248 can be extrapolated to determine the points of intersection. Each of the points of convergence can be selected as a point fix 280.

Referring collectively to FIGS. 20, 22A, 22B and 23, the point fix function 40 can comprise the length filtering function 310 for filtering the transversal edges based upon a length ratio. The length filtering function 310 can be utilized to remove the transversal edges 270 that do not cross a panel of the skylights 116 to a desired extent. For example, each transversal edge 270 can be compared to corresponding points of convergence, i.e., the points of convergence that were determined from the transversal edge 270. Specifically, any transversal edges 270 with a length ratio below a threshold level may be removed, where the length ratio is given by the ratio of length (transversal edge):length (span between points of convergence). Accordingly, the point fixes 280 can be selected from the points of convergence of the remaining transversal edges 270, i.e., the transversal edges 270 that were not removed. It is noted that the length filtering function 310 was utilized to ensure that none of the point fixes 280 was selected from the short edges 276, i.e., the transversal edges 270 classified as short edges 276 were removed from consideration for point fixes 280.

The point fix function 40 can comprise a feature reporting function 312 for reporting the extracted features to the EBL. Specifically, the feature reporting function 312 can report the centerline 250 and the point fixes 280 to the EBL for use for navigation. Specifically, the EBL can compare the centerline 250 and the point fixes 280 to corresponding features in a map for navigational purposes. Additionally, for each reported point pair (i.e., derived from the one of the transversal edges 270) of the point fixes 280, a flag could be added denoting whether the point fix 280 sits on a transition of dark (between panels of the skylights 116) to bright (panels of the skylights 116) pixels or bright to dark pixels. The flag can be utilized to increase the accuracy of the EBL and reduce the chance of aliasing between an adjacent pair of points. The flag labeling of dark-to-bright versus bright-to-dark transitions could be achieved by scanning along the centerline 250 and averaging a set of points on either side of each point fix 280 to detect whether it is a dark or bright patch.

Additionally, in some embodiments, a non-maximum suppression process may be executed upon the remaining transversal edges 270 prior to the reporting of the point fixes 280 to the EBL. The purpose of the non-maximum suppression function is to select a single transversal edge 270 when a plurality of such have been detected from a single physical skylight 116 panel edge in the image 240. If the transversal edges 270 are sorted by their distance to an end point of the skylight centerline 250, a non-maximum suppression window can be defined such that for each remaining transversal edge 270 for which other transversal edges 270 are found within the distance defined by the window, the non-maximum suppression function can be executed to select only the strongest edge and suppress all others. In one embodiment the strength of the transversal edge 270 can be defined as the difference between the average pixel intensity of the sampled patches either side of the transversal edge 270 as described above for the setting of the flag denoting the nature of the edge transition being of a dark-to-bright type or bright-to-dark type. Alternatively or additionally, the strength can be inferred directly from the gradient magnitude image if it has been made available by the create edge image function 22 or provided by some separate process as direct input. In this case the average gradient magnitude, or alternatively or additionally the cumulative gradient magnitude, along the transversal edge 270 can indicate the relative strength of the edge line segment, where a higher gradient magnitude suggests a better fit along the physical edge between skylight 116 and background ceiling 112.

Referring collectively to FIGS. 11, 17, 20 and 23, the feature reporting function 312 may comprise a process that attaches a flag to each point fix 280 indicating whether the transversal edge 270 comprising the point fix 280 lies on a dark-to-bright or bright-to-dark edge transition in the image 240. As described above, one possible method to set this flag may be to average the pixel intensities of a set of pixels along scan lines, which may include the centerline 250, either side of the transversal edge 270 and the side with the higher average intensity can be determined to be the bright side and the side with the lower average intensity can be determined to be the dark side. Alternatively or additionally, in embodiments where the gradient orientation image has been computed in the create edge image function 32 of the process skylights function 30, or is provided by a separate process, the decision of whether a transversal edge 270 and its respective point fixes 280 lie on a dark-to-bright or bright-to-dark transition can be achieved by a simple look-up and averaging of the gradient orientation values along the pixel locations that form the transversal edge 270 within the gradient orientation image. The gradient orientation image is calculated from first order derivative images in the—and y directions and so the phase angles of the gradient orientation directly indicate the direction of transition between dark and bright regions of the input image 240.

Referring collectively to FIGS. 11, 12, 13, 20 and 23, it is noted that the process comprised within the feature reporting function 312 for determining whether a transversal edge 270 and its point fixes 280 belong to a dark-to-bright class or bright-to-dark class may alternatively be performed at a different stage within the point fix function 40 without altering the scope or result of the embodiment. Indeed in some embodiments it may be preferred to execute this computation as part of the extract transversal lines function 304. In this case, knowledge of the angle of the longer edges of the skylight candidate regions 426 and that the two transversal edge transition classes are ninety degrees out of phase either side of this angle can be utilized to threshold the gradient orientation image to produce two binary image masks. These masks can be applied to the binary edge image 436 to produce two separate masked input images for the Hough transform used in the extract transversal lines function 304, where one of the masked input images suppresses pixels that are too dissimilar to the gradient orientation of dark-to-bright transversal edges 270 and thereby predisposes the Hough transform to return transversal edges 270 of the dark-to-bright class, and the other masked input image suppresses pixels that are too dissimilar to the gradient orientation of bright-to-dark transversal edges 270 and thereby predisposes the Hough transform to return transversal edges 270 of the bright-to-dark class. In this scenario, the flag indicating whether an extracted transversal edge 270 lies on a dark-to-bright or bright-to-dark transition can be set in the extract transversal lines function 304 and known for the remainder of the point fix function 40 and alternatively or additionally utilized to assist in other processing within any subsequent functions comprised within the point fix function 40.

Referring collectively to FIGS. 1 and 23, the skylights 116 may be separated by structural objects of the warehouse 110 having a finite depth such as, for example, cross beams between the skylights 116. Accordingly, the structural objects may occlude the true corners 130 of the skylights 116, i.e., the structural object may be located between the camera 102 and the skylight 116. In some embodiments, it may be preferred for the EBL to use the point fixes 280 for which the camera 102 has direct line of sight. Thus, the EBL can utilize point fixes 280 and associated flags to determine whether it is likely that the point fix 280 corresponds to a corner 130 of a skylight 116 or is occluded.

Referring collectively to FIGS. 2 and 6, the CFE algorithm 10 can comprise a process round lights function 26 for extracting centroids from round light feature candidates 416 from the input image 200 of the ceiling 112. In one embodiment, the round light candidates 416 can be produced by a feature detection function 22, which can comprise and illumination-invariant feature detection function 60, and filtered by a feature classification function 24. Alternatively or additionally the round light candidates 416 can be provided by separate process as direct input. In some embodiments, the CFE algorithm 10 may comprise a process merged lights function 28 to extract centroids from low-level candidate features that have been identified as belonging to a merged light class. Centroid features extracted by the process round lights function 26 and the process merged lights 28 can be combined with centerline features 250 and point fix features 280 and this collection or any subset thereof can be reported by the report features step 54 to the EBL to be utilized for assisting in the localization or navigation of the vehicle 100 within the warehouse 110. Prior to the report features step 54, the CFE algorithm 10 can comprise a filter features by region of interest function 50 that can remove features outside of a defined region of interest. Accordingly, any remaining features, such as reflections from a truck mast, can be removed. Additionally, the convert coordinate frames function 52 can convert feature coordinates from an image processing frame (e.g., origin in top-left corner) to EBL frame (e.g., origin in center of image) before the features reported 54 are published to the EBL.

It should now be understood that embodiments described herein can be utilized to navigate the industrial vehicle through the warehouse utilizing an illumination-invariant feature detection. Moreover, the embodiments described herein can have particular utility in buildings, e.g., warehouses that are round light sparse or lighted primarily by skylights and natural sources of illumination. Accordingly, the illumination-invariant feature detection described herein can be utilized to increase the environmental efficiency of a warehouse. For example, during day light hours the use of electricity can be reduced because the industrial vehicles described herein can be navigated through the use of naturally illuminated skylights. Moreover, the embodiments described herein can increase the robustness of the EBL through the use of illumination-invariant feature detection. Moreover, the increased robustness of the EBL can reduce the environmental costs of operating a warehouse with industrial vehicles, i.e., mileage caused by localization error can be mitigated, which can reduce the power consumed by the industrial vehicle and the maintenance costs of the industrial vehicle.

For the purposes of describing and defining the present invention, it is noted that reference herein to a characteristic of the subject matter of the present disclosure being a "function of" a parameter, variable, or other characteristic is not intended to denote that the characteristic is exclusively a function of the listed parameter, variable, or characteristic. Rather, reference herein to a characteristic that is a "function" of a listed parameter, variable, etc., is intended to be open ended such that the characteristic may be a function of a single parameter, variable, etc., or a plurality of parameters, variables, etc.

It is also noted that recitations herein of "at least one" component, element, etc., should not be used to create an inference that the alternative use of the articles "a" or "an" should be limited to a single component, element, etc.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

It is noted that terms like "preferred," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

For the purposes of describing and defining the present invention it is noted that the terms "substantially" and "approximately" are utilized herein to represent the inherent degree of uncertainty that may be attributed to any quantitative comparison, value, measurement, or other representation. The terms "substantially" and "approximately" are also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A system comprising a vehicle camera, and a navigation module comprising memory and a processor, wherein:

the vehicle camera is communicatively coupled to the navigation module and is configured to capture input images;

the navigation module is configured to distinguish between object types in the input images by executing machine readable instructions to run a cascading series of image smoothing and subsampling operations upon the input images to generate a collection of smoothed images, build a first set of images from the collection of smoothed images, wherein the first set of images has a same size and structure as the smoothed images, build a second set of images from the collection of smoothed images, wherein the second set of images has the same size and structure as the smoothed images, utilize the first set of images to identify circular candidate object types in the input images, utilize the second set of images to identify elongated candidate object types in the input images, subject the identified candidate object types to candidate feature processing to identify valid object types in the input images, and generate navigational data based upon the identified valid object types.

2. The industrial vehicle of claim 1 wherein the collection of smoothed images is a Gaussian scale space pyramid.

3. The industrial vehicle of claim 2 wherein the Gaussian scale space pyramid is approximated by convolution with binomial filter kernels.

4. The industrial vehicle of claim 1 wherein the subsampling operations are implemented conditionally as a function of available navigation module computing power.

5. The industrial vehicle of claim 1 wherein the first set of images is a determinant of Hessian response pyramid formed utilizing a determinant of Hessian; and the second set of images is a trace of Hessian response pyramid formed utilizing a trace of Hessian.

6. The industrial vehicle of claim 5 wherein the determinant of Hessian response and trace of Hessian response are calculated based on each scale space image being convolved with second-order partial derivative filter kernels.

7. The industrial vehicle of claim 5 wherein the determinant of Hessian response is calculated by subtraction of a mixed second-order partial derivative term.

8. The industrial vehicle of claim 5 wherein the determinant of Hessian response suppresses responses to objects characterized by different rates of image intensity change along longitudinal and transverse axial directions.

9. The industrial vehicle of claim 8 wherein the determinant of Hessian response is utilized for multiscale non-maximum suppression wherein local maxima are located within a window comprising scale and spatial dimensions.

10. The industrial vehicle of claim 9 wherein an absolute minimum threshold is applied to prevent excessive noisy false positive determinant of Hessian responses.

11. The industrial vehicle of claim 5 wherein the determinant of Hessian response is utilized in a filtering keypoints function for removing candidate points that do not likely correspond to ceiling lights.

12. The industrial vehicle of claim 11 wherein the filtering keypoints function utilizes other filters on candidate points to check against empirically set thresholds.

13. The industrial vehicle of claim 12 wherein the other filters comprise scales at which keypoints are detected, a spatial location of a keypoint, a magnitude of the determinant of Hessian response at the keypoint location, a machine-learning classifier, or an average trace of Hessian response values of a surrounding area.

14. The industrial vehicle of claim 5 wherein the determinant of Hessian response is utilized in a refining keypoints function for refining spatial position and scale of ceiling light candidate keypoints.

15. The industrial vehicle of claim 5 wherein the trace of Hessian response is utilized in a sum large-scale trace of Hessian response images function for summing a selection of trace of Hessian response images from a trace of Hessian response pyramid into an integrated trace of Hessian response image.

16. The industrial vehicle of claim 15 wherein skylight regions are searched for within the trace of Hessian response pyramid.

17. The industrial vehicle of claim 5 wherein the trace of Hessian response is further processed by a threshold integrated trace of Hessian response function, wherein the trace of Hessian response is smoothed and a threshold is applied.

18. The industrial vehicle of claim 5 wherein the trace of Hessian response is utilized in a connected component filtering function for extracting and filtering connected components based on a binary thresholded integrated trace of Hessian response image and the connected component filtering function filters for size and aspect ratio to select substantially rectangular regions.

19. A navigation module comprising memory and a processor, wherein:

the memory is coupled to the processor; and the processor is configured to distinguish between object types in input images by executing machine readable instructions to run a cascading series of image smoothing and subsampling operations upon the input images to generate a collection of smoothed images, build a first set of images from the collection of smoothed images, wherein the first set of images has a same size and structure as the smoothed images, build a second set of images from the collection of smoothed images, wherein the second set of images has the same size and structure as the smoothed images, utilize the first set of images to identify circular candidate object types in the input images, utilize the second set of images to identify elongated candidate object types in the input images, subject the identified candidate object types to candidate feature processing to identify valid object types in the input images, and generate navigational data based upon the identified valid object types.

* * * * *